US007028122B2

(12) United States Patent
Williams

(10) Patent No.: US 7,028,122 B2
(45) Date of Patent: Apr. 11, 2006

(54) SYSTEM AND METHOD FOR PROCESSING NODE INTERRUPT STATUS IN A NETWORK

(75) Inventor: Emrys Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 458 days.

(21) Appl. No.: 10/213,982

(22) Filed: Aug. 7, 2002

(65) Prior Publication Data

US 2004/0030819 A1 Feb. 12, 2004

(51) Int. Cl.
*G06F 13/24* (2006.01)

(52) U.S. Cl. ...................... 710/260; 710/262; 710/266; 710/268

(58) Field of Classification Search ........ 710/260–263, 710/266, 268; 712/211
See application file for complete search history.

(56) References Cited

U.S. PATENT DOCUMENTS

| | | | | |
|---|---|---|---|---|
| 4,860,201 | A | 8/1989 | Stolfo et al. | |
| 5,606,703 | A | 2/1997 | Brady et al. | |
| 5,907,712 | A | 5/1999 | Slane | |
| 6,052,739 | A * | 4/2000 | Bopardikar et al. | 719/321 |
| 6,078,970 | A | 6/2000 | Nordstrom et al. | |
| 6,085,278 | A | 7/2000 | Gates et al. | |
| 6,449,667 | B1 | 9/2002 | Ganmukhi et al. | |
| 6,606,676 | B1 * | 8/2003 | Deshpande et al. | 710/262 |
| 6,687,865 | B1 | 2/2004 | Dervisoglu et al. | |
| 6,742,139 | B1 | 5/2004 | Forsman et al. | |

FOREIGN PATENT DOCUMENTS

| | | |
|---|---|---|
| GB | 2272310 | 5/1994 |

OTHER PUBLICATIONS

International search report application no. GB0317341.6 mailed Feb. 2, 2004.

* cited by examiner

*Primary Examiner*—Khanh Dang
(74) *Attorney, Agent, or Firm*—Meyertons Hood Kivlin Kowert & Goetzel, P.C.; B. Noël Kivlin

(57) ABSTRACT

The invention relates to the processing of state information such as interrupt status in a hierarchical network of nodes having a tree configuration. There is a root node at the top of the hierarchy, one or more intermediate nodes, and a plurality of leaf nodes at the bottom of the hierarchy. Each leaf node is linked to the root node by zero, one or more intermediate nodes. Each leaf node maintains information about one or more interrupt states, and each intermediate node maintains information derived from the interrupt states of leaf nodes below it in the hierarchy. This interrupt information is then processed by navigating from the root node to a first leaf node having at least one set interrupt state which is then masked out. The status of any intermediate nodes between this first leaf node and the root node is then updated if appropriate to reflect the fact that the particular interrupt state at the first leaf node is now masked out. These steps are then repeated with respect to all the other leaf nodes in the network having at least one interrupt state.

52 Claims, 9 Drawing Sheets

SYSTEM AND METHOD FOR PROCESSING NODE INTERRUPT STATUS IN A NETWORK

FIELD OF THE INVENTION

The present invention relates to the processing state information such as interrupts in a hierarchical network of nodes having a tree configuration.

BACKGROUND OF THE INVENTION

Modern computer systems often comprise many components interacting with one another in a highly complex fashion. For example, a server installation may include multiple processors, configured either within their own individual (uniprocessor) machines, or combined into one or more multiprocessor machines. These systems operate in conjunction with associated memory and disk drives for storage, video terminals and keyboards for input/output, plus interface facilities for data communications over one or more networks. The skilled person will appreciate that many additional components may also be present.

The ongoing maintenance of such complex systems can be an extremely demanding task. Typically various hardware and software components need to be upgraded and/or replaced, and general system administration tasks must also be performed, for example to accommodate new uses or users of the system. There is also a need to be able to detect and diagnose faulty behaviour, which may arise from either software or hardware problems.

One known mechanism for simplifying the system management burden is to provide a single point of control from which the majority of control tasks can be performed. This is usually provided with a video monitor and/or printer, to which diagnostic and other information can be directed, and also a keyboard or other input device to allow the operator to enter desired commands into the system.

It will be appreciated that such a centralised approach generally provides a simpler management task than a situation where the operator has to individually interact with all the different processors or machines in the installation. In particular, the operator typically only needs to monitor diagnostic information at one output in order to confirm whether or not the overall system is operating properly, rather than having to individually check the status of each particular component.

However, although having a single control terminal makes it easier from the perspective of a system manager, the same is not necessarily true from the perspective of a system designer. Thus the diagnostic or error information must be passed from the location where it is generated, presumably close to the source of the error, out to the single service terminal.

One known mechanism for collating diagnostic and other related system information is through the use of a service bus. This bus is terminated at one end by a service processor, which can be used to perform control and maintenance tasks for the installation. Downstream of the service processor, the service bus connects to all the different parts of the installation from which diagnostics and other information have to be collected.

(As a rough analogy, one can consider the service processor as the brain, and the service bus as the nervous system permeating out to all parts of the body to monitor and report back on local conditions. However, the analogy should not be pushed too far, since the service bus is limited in functionality to diagnostic purposes; it does not form part of the mainstream processing apparatus of the installation).

In designing the architecture of the service bus, there are various trade-offs that have to be made. Some of these are standard with communications devices, such as the (normally conflicting) requirements for speed, simplicity, scalability, high bandwidth or information capacity, and cheapness. However, there is also a specialised design consideration for the service bus, in that it is particularly likely to be utilised when there is some malfunction in the system. Accordingly, it is important for the service bus to be as reliable and robust as possible, which in turn suggests a generally low-level implementation.

One particular problem is that a single fault in a complex system will frequently lead to a sort of avalanche effect, with multiple errors being experienced throughout the system. There is a danger that in trying to report these errors, the service bus may be swamped or overloaded, hindering rapid and effective diagnosis of the fault.

SUMMARY OF THE INVENTION

In accordance with one embodiment of the invention, there is provided a method of processing interrupt state information in a hierarchical network of nodes having a tree configuration, comprising a root node at the top of the hierarchy, one or more intermediate nodes, and a plurality of leaf nodes at the bottom of the hierarchy. Each leaf node is linked to the root node by zero, one or more intermediate nodes. Intrinsic information is maintained at each leaf node about one or more interrupt states, and extrinsic information is maintained at each intermediate node. This extrinsic information is derived from the interrupt states of those leaf nodes below the intermediate node in the hierarchy. The method navigates from the root node to a first leaf node having at least one set interrupt state, and masks out the set interrupt state at the first leaf node. The extrinsic information in any intermediate nodes above the first leaf node in the hierarchy is then updated in accordance with the fact that the set interrupt state at the first leaf node is now masked out. This process is repeated for all other leaf nodes in the network having a set interrupt state.

A node typically represents a computer system or a component (such as a processor) within a computer system. The network can span one or more computer systems, with the nodes linked together by any suitable data communications links. Note that neither the nodes nor the communications links have to be homogeneous throughout the network. The method is also applicable to other forms of network in which interrupt information is transferred from one node to another.

Leaf nodes at the bottom of the tree store intrinsic information; in other words, as far as the network is concerned, intrinsic information is generated internally within the node where it is stored (although its ultimate origin may be outside the leaf node per se). This is to be contrasted with extrinsic information stored at intermediate nodes, which is dependent on the interrupt state of leaf nodes below the intermediate node in the hierarchy, rather than any internal state of the intermediate node itself.

In one embodiment, any change in the interrupt state of a node in the network is automatically propagated to those nodes above it in the hierarchy, which then update their extrinsic information in accordance with the changed interrupt state of the node. Thus if the interrupt state of a node changes, it spontaneously or autonomously sends notification of this to the node above it in the network, or sets a state on some line that can be detected by the other node.

In general, it is the responsibility of the root node to process the interrupt state information from all the leaf nodes. Since there are many leaf nodes for a single root node, it is important for the root node to be able to do this without being bombarded by excessive amounts of interrupt state data being sent back up the network. In one embodiment, this is assisted by two levels of consolidation. Firstly, within a leaf node itself, there can be multiple information items, each of which is set according to whether or not a corresponding interrupt is present, and each of which may be individually masked out. A leaf node is regarded as having a particular output state if at least one of these information items is set without being masked out. The extrinsic information maintained at those intermediate nodes above the leaf node in the hierarchy is then determined accordingly. Secondly, within an intermediate node, the extrinsic information represents a consolidated version of the individual interrupt states of all leaf nodes and any intermediate nodes below it in the hierarchy. This consolidated version is then regarded as representing the particular output state of the intermediate node, for passing up the tree. As a result of the above scheme, there is only a single overall (consolidated) interrupt status associated with any given node, whether a leaf node or an intermediate node, thereby providing a manageable information flow to the root node.

A limitation of the above approach is that once an intermediate node is set to the consolidated output state, it is, in effect, saturated. In other words, it can no longer respond if another leaf node below it is set to the particular output state, since there will not be any change in the consolidated status for the intermediate node. However, the method described above allows the network to re-sensitise itself. In one embodiment, this is done by repeatedly descending through those intermediate nodes whose extrinsic information indicates that a leaf node below it has the particular output state, and masking out the set interrupt states at the relevant leaf nodes (typically on an item by item basis). This has the effect of removing the particular output state of this leaf node from the consolidated version seen by intermediate nodes above the leaf node in the hierarchy, which in turn allows output state information from other leaf nodes to propagate up this route.

Thus the particular output state of each leaf node can be examined one at a time, and any interrupt states contained within that leaf node masked out. This then provides a systematic and controlled approach for the root node to investigate interrupt status at the various leaf nodes.

Note that the interrupt states of the leaf node are simply masked out to allow the network to be quickly re-sensitised. Any more substantive processing and resetting of the interrupt states of a leaf node is likely to be more time-consuming, and so is deferred until later. Although the network can no longer detect the state of the masked information items, this is acceptable because in many circumstances the event of most interest is when an information item first indicates the presence of a particular interrupt state. Subsequent transitions in this interrupt state are then of lesser interest until the root node or some other control system is properly able to reset the item (or more accurately, the underlying component or device with which the interrupt is associated). At this point, the mask for the interrupt can be cleared, so that the network is once again sensitised to this information item.

In one embodiment, each information item comprises a binary variable representing the presence or absence of an interrupt. A status register is used for storing the information items as individual bits, and a masking register is used for storing a plurality of mask bits. Each mask bit corresponds to an information item in the status register, so that an information item can be masked out by setting the corresponding mask bit. (Of course, the mask can be configured as having negative or positive polarity).

In one embodiment, at least one intermediate node in the network also maintains intrinsic information comprising one or more information items. Each of these items can be set according to whether or not a corresponding interrupt is present, and each item can be individually masked out. This intrinsic information can be processed in substantially the same manner as the intrinsic information in leaf nodes. (Note that the consolidated interrupt status of such an intermediate node is set to indicate the presence of an interrupt if any information item therein is set to indicate the presence of an interrupt, or if any leaf node below it in the hierarchy has an interrupt present).

In another embodiment of the invention, there is provided a method of processing interrupt state information in a leaf node in a hierarchical network of nodes. The network has a tree configuration comprising a root node at the top of the hierarchy, one or more intermediate nodes, and a plurality of leaf nodes at the bottom of the hierarchy. Each leaf node is linked to the root node by zero, one or more intermediate nodes. The method involves maintaining one or more information items at the leaf node, each of which may be set according to whether or not a corresponding interrupt is present. Each information item may also be individually masked out. The leaf node is regarded as having a particular output state if at least one of the information items is set to indicate the presence of an interrupt without being masked out. It is assumed that initially the leaf node does not have the particular output state, but subsequently at least one information item is set to indicate that an interrupt is present. This first change in interrupt state of the leaf node is propagated to the intermediate node above it in the hierarchy. Responsive to a command received over the network, the relevant set interrupt state is then masked out, and consequently a second change in the particular output state of the leaf node is now propagated to the intermediate node above it in the hierarchy.

In another embodiment, there is provided a method of processing interrupt state information in an intermediate node in a hierarchical network of nodes. The network has a tree configuration comprising a root node at the top of the hierarchy, one or more intermediate nodes, and a plurality of leaf nodes at the bottom of the hierarchy. Each leaf node is linked to the root node by zero, one or more intermediate nodes. The method involves maintaining at the intermediate node an extrinsic information item representing a consolidated version of whether an interrupt state is present in any leaf node or intermediate node below the intermediate node in the hierarchy, and one or more intrinsic information items, each of which may be set to indicate the presence of a corresponding interrupt state, and each of which may be individually masked out. The intermediate node is set to have an overall interrupt state if at least one of the intrinsic or extrinsic information items indicates the presence of an interrupt state without being masked out. The intermediate node is responsive to a command from higher in the network to mask out any intrinsic information item that is set to indicate the presence of an interrupt state, with any change in the overall interrupt state of the intermediate node then being propagated up the network hierarchy.

In accordance with another embodiment of the invention, there is provided apparatus forming a hierarchical network of nodes having a tree configuration, comprising a root node at the top of the hierarchy, one or more intermediate nodes, and a plurality of leaf nodes at the bottom of the hierarchy. Each leaf node is linked to the root node by zero, one or more intermediate nodes. Each leaf node includes memory for maintaining intrinsic information node about whether one or more interrupt states in the leaf node are set, a mask corresponding to each interrupt state, for causing the state to be disregarded if the mask is set, and a communications link to an intermediate node. The leaf node is responsive to a change in one or more interrupt states to notify the intermediate node accordingly over the communications link. Each intermediate node includes memory for maintaining extrinsic information about leaf nodes below it in the hierarchy having at least one set interrupt state. The apparatus further includes logic for processing each leaf node in turn having at least one set interrupt state to mask out the set interrupt state.

In accordance with another embodiment of the invention, there is provided apparatus for use as a leaf node in a hierarchical network of nodes. The network has a tree configuration comprising a root node at the top of the hierarchy, one or more intermediate nodes, and a plurality of leaf nodes at the bottom of the hierarchy. Each leaf node is linked to the root node by zero, one or more intermediate nodes. The apparatus comprises memory for maintaining one or more information items at the leaf node, each of which is set according to whether or not a corresponding interrupt is present, and each of which may be individually masked out responsive to a command received over the network. The leaf node is regarded as having a particular output state if at least one of the information items is set without being masked out. Initially it is assumed that the leaf node does not have the particular output state. The apparatus further comprises logic for setting at least one information item to indicate that a corresponding interrupt is present, and a communications link for connection to an intermediate node immediately above the leaf node in the hierarchy, to allow a change in the output state of the leaf node to be automatically propagated over the link to the intermediate node.

In accordance with another embodiment, there is provided apparatus for use as an intermediate node in a hierarchical network of nodes. The network has a tree configuration comprising a root node at the top of the hierarchy, one or more intermediate nodes, and a plurality of leaf nodes at the bottom of the hierarchy. Each leaf node is linked to the root node by zero, one or more intermediate nodes. The apparatus includes a memory for storing an extrinsic information item representing a consolidated version of whether an interrupt is present in any leaf node or intermediate node in the hierarchy below the intermediate node, and for storing one or more intrinsic information items, each of which may be set to indicate the presence of a corresponding interrupt, and each of which may be individually masked out. The apparatus further includes logic for setting the intermediate node to have an overall interrupt state, if any of the intrinsic or extrinsic information items in the intermediate node indicates the presence of an interrupt without having been masked out. In addition, the logic is responsive to a predetermined command from higher in the network to mask out any intrinsic information items that indicate the presence of an interrupt. The apparatus also includes a communications link for propagating any change in the overall interrupt state of the intermediate node automatically up the network hierarchy.

In accordance with another embodiment of the invention, there is provided a computer program product comprising machine readable program instructions. When loaded into one or more devices these can be executed by the device(s) to implement the methods described above. Note that the program instructions are typically supplied as a software product for download over a physical wired or wireless network, such as the Internet, or on a physical storage medium such as DVD or CD-ROM. In either case, the software can then be loaded into machine memory for execution by an appropriate processor (or processors), or by some other semiconductor device, and may also be stored on a local non-volatile storage, such as a hard disk drive. The program instructions may also represent microcode or firmware, potentially supplied preloaded into a machine, for example by storage in a ROM, or burnt into a programmable.logic array (PLA).

It will be appreciated that the embodiments based on apparatus and computer program products can generally utilise the same particular features as described above in relation to the method embodiments.

BRIEF DESCRIPTION OF THE DRAWINGS

Various embodiments of the invention will now be described in detail by way of example only with reference to the following drawings in which like reference numerals pertain to like elements and in which:

FIG. 1 illustrates in schematic form an example of a topology for a service bus 200. As will be described in more detail below, such a service bus 200 can be used for performing maintenance and support operations within a computer installation.

Figure 1:
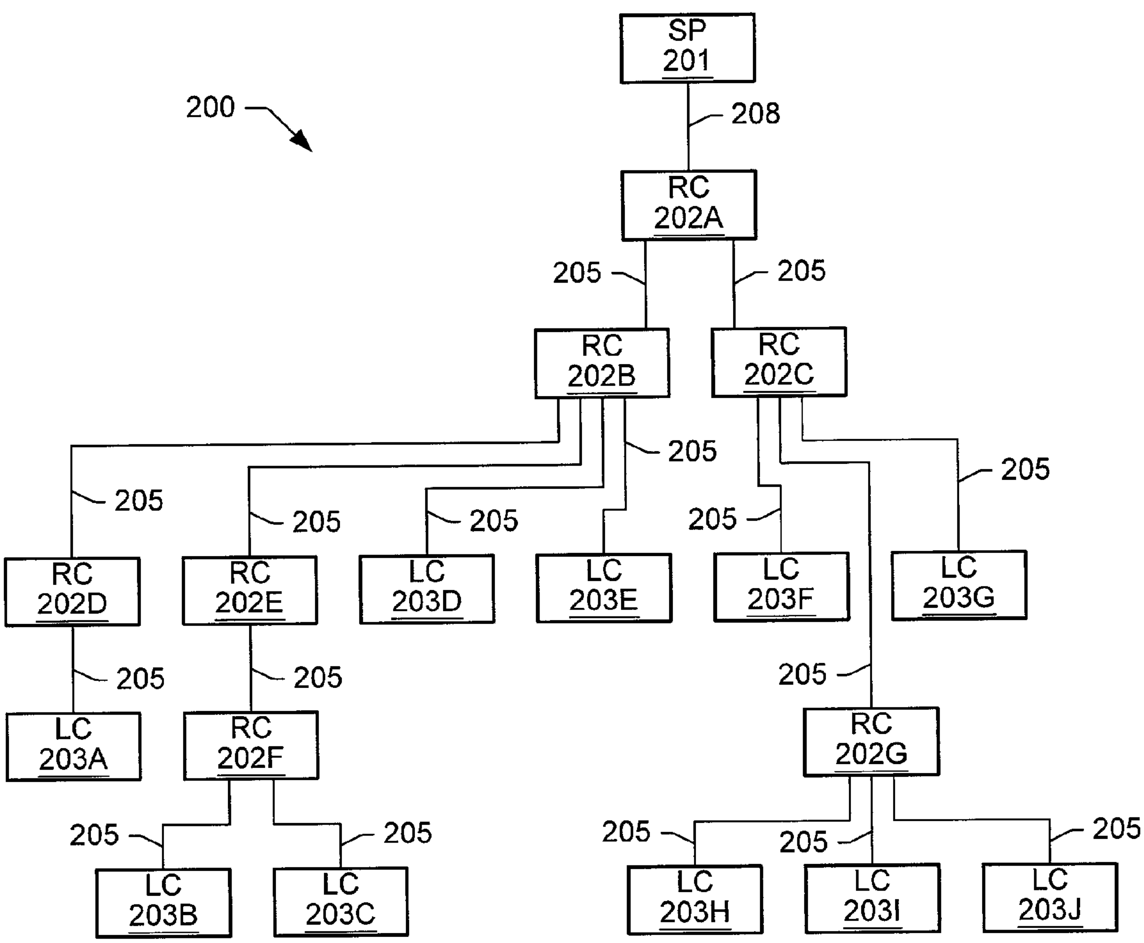
FIG. 1 is a schematic diagram of a topology of for a service bus for use in a computer installation in accordance with one embodiment of the present invention.

The service bus 200 of FIG. 1 is configured as a hierarchical tree comprising multiple nodes in which the individual nodes are linked by bus 205. At the top of the tree is a service processor (SP) node 201. This is then connected by bus 208 to a router chip (RC) 202A which in turn is connected to router chips 202B and 202C, and so on. At the bottom of the tree are various leaf nodes representing leaf chips (LC) 203A . . . J. Each leaf chip is connected back to the service processor 201 by one or more levels of router chips 202A . . . G, which represent intermediate nodes in the hierarchy.

Note that a node may comprise a wide variety of possible structures from one or more whole machines, down to an individual component or a device within such a machine, such as an application specific integrated circuit (ASIC). There may be many different types of node linked to the service bus 205. The only requirement for a node is that it must be capable of communicating with other nodes over the service bus 205.

For simplicity, the tree architecture in FIG. 1 has the property that each node in the tree may be connected to one or more nodes immediately beneath it in the hierarchy (referred to as "child" nodes), but is connected to one and only one node immediately above it in the hierarchy (referred to as a "parent" node). The only exceptions to this are: the root node, i.e. the service processor, which is at the top of the hierarchy and so does not have a parent node (but does have one or more child nodes); and the leaf nodes, which are at the bottom of the hierarchy, and so do not have any child nodes (but do always have one parent node). One consequence of this architecture is that for any given node in the tree, there is only a single (unique) path to/from the service processor 201.

It will be appreciated that within the above constraints a great variety of tree configurations are possible. For example, in some trees the leaf chips may have a constant depth, in terms of the number of levels within the hierarchy. In contrast, the tree of FIG. 1 has variable depth. Thus leaf chip 203B has a depth of 5 (measured in nodes down from the service processor), whereas leaf chip 203G has a depth of only 3. Furthermore, some tree configurations may require every node (except for leaf nodes) to have a fixed number of children—one example of this is a so-called binary tree, in which each node has two children. However, the precise details of the tree architecture in any given embodiment are not significant for present purposes.

It will also be appreciated that the single path in FIG. 1 from the service processor to any given node is actually a point of weakness, in that if a particular node fails, then its child nodes (and any further descendant nodes) become unreachable. Therefore it is possible to provide at least two separate routes to any given node in the hierarchy, in order to provide redundancy against this sort of node failure. Similarly, the service processor itself can be duplicated, resulting in a system having two or more roots.

Figure 2:
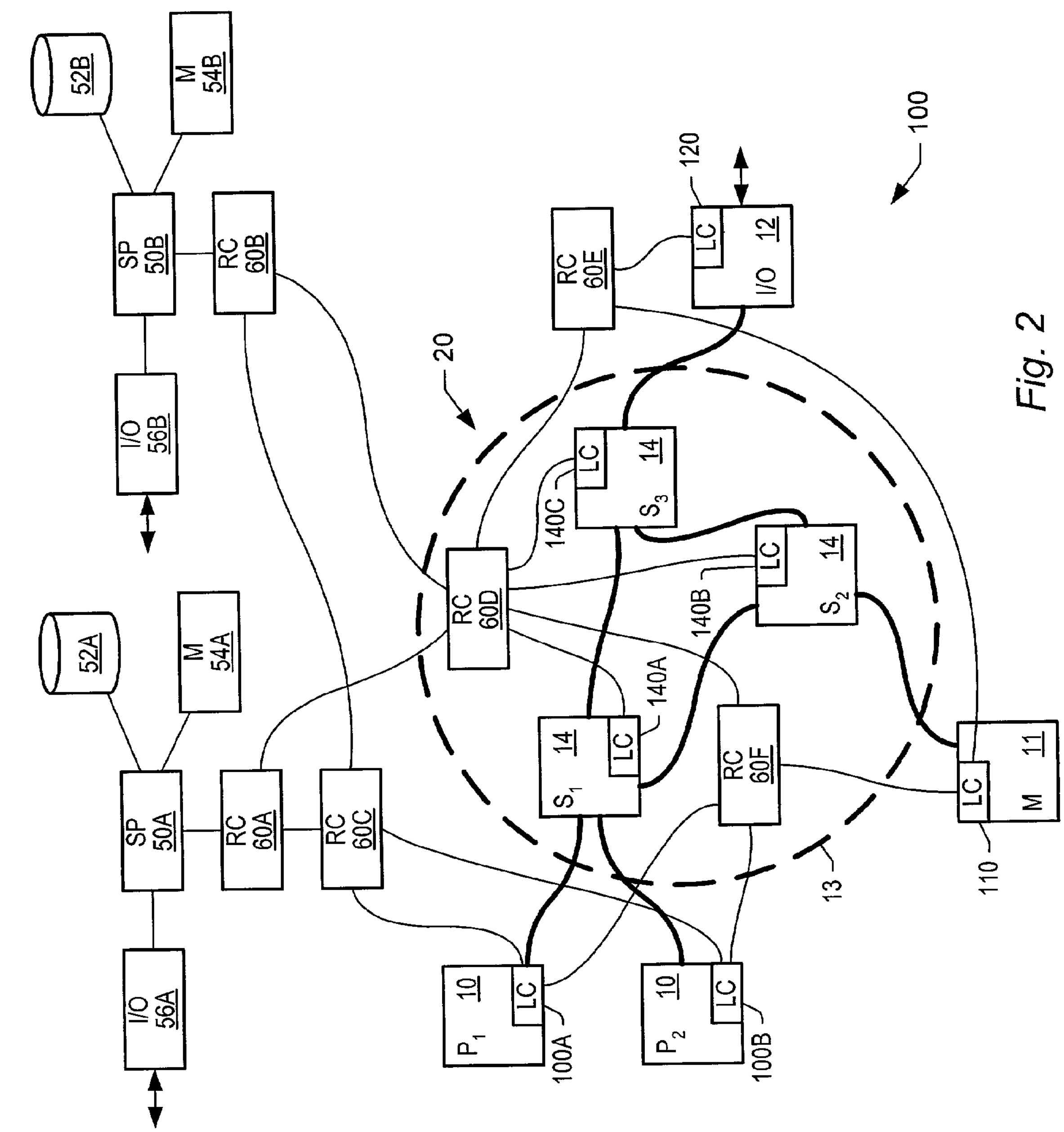
FIG. 2 illustrates a computer installation including a service bus in accordance with one embodiment of the present invention.

A computing installation incorporating a service bus is illustrated in FIG. 2, which schematically depicts a computer system 100 representing a typical large-scale server system. This includes processor units $P_1$ and $P_2$ 10, memory 11, and I/O device 12, all interlinked by a switching fabric 20 incorporating three switching blocks, $S_1$, $S_2$, $S_3$ 14. Of course, this particular configuration is for illustration only, and there are many possibilities. For example, there may be fewer or more processor units 10, and at least some of memory 11 may be directly attached to an individual processor unit for dedicated access by that processor unit (this can be the case in a non-uniform memory architecture (NUMA) system). Likewise, the switching fabric 20 may include more or fewer switching blocks 14, or may be replaced partly or completely by some form of host bus. In addition, computer system 100 will typically include components attached to I/O unit 12, such as disk storage units, network adapters, and so on, although for the sake of clarity, these have been omitted from FIG. 2.

Computer system 100 also incorporates a service bus, headed by service processors 50A and 50B. Each of these can be implemented by a workstation or similar, including associated memory 54, disk storage 52 (for non-volatile recording of diagnostic information), and I/O unit 56. In the embodiment of FIG. 2, only one service processor is operational at a given time, with the other representing a redundant backup system, in case the primary system fails. However, other systems could utilise two or more service processors simultaneously, for example for load sharing purposes.

The topology of the service bus in FIG. 2 generally matches that illustrated in FIG. 1, in that there is a hierarchical arrangement. Thus the service processors 50 are at the top of the hierarchy, with leaf nodes (chips) 140 at the bottom, and router chips 60 inbetween. The router chips provide a communication path between the leaf chips and the service processor.

The leaf chips 100 and router chips are typically formed as application specific integrated circuits (ASICs), with the leaf chips being linked to or incorporated in the device that they are monitoring. As will be described in more detail below, a given chip may function as both a router chip and a leaf chip. For example, router chip 60F and leaf chip 140B might be combined into a single chip. Note also that although not shown in FIG. 2, a leaf chip may be associated with a communications link or connection (rather than an endpoint of such a link), in order to monitor traffic and operations on that link. A further possibility is that the leaf chip circuitry is fabricated as an actual part of the device to be monitored (such as by embedding leaf chip functionality into a memory controller within memory 11).

In the particular embodiment illustrated in FIG. 2, each leaf chip is connected to both of the service processors. For example, leaf chip 100B is linked to service processor 50A through router chips 60C and 60A, and to service processor 50B through router chips 60F, 60D, and 60B. In fact, as depicted in FIG. 2, there are two routes between leaf chip 100B and service processor 50A, the first as listed above, the second via router chips 60F, 60D, and 60A. This duplication of paths provides another form of redundancy in the service bus. It will be appreciated that in some embodiments there may be two separate routes from a service processor to each leaf chip in the system, in order to provide protection against failure of any particular link In one particular embodiment, the service processor 201 is connected to the topmost router chip 202A (see FIG. 1) by a PCI bus 208. Beneath this, the service bus is implemented as a synchronous serial bus 205 based on a two-wire connection, with one wire being used for downstream communications (i.e. from a service processor), and the other wire being used for upstream communications (i.e. towards the service processor). A packet-based protocol is used for sending communications over the service bus, based on a send/response strategy. These communications are generally initiated by the service processor 201, which can therefore be regarded as the sole arbiter or controller of the service bus 205, in order to access control and/or status registers within individual nodes. As described in more detail below, the only exception to this is for interrupt packets and their confirmation, which can be generated autonomously by lower level nodes.

A packet sent over service bus 205 generally contains certain standard information, such as an address to allow packets from the service processor to be directed to the desired router chip or leaf node. The skilled person will be aware of a variety of suitable addressing schemes. The service processor is also responsible for selecting a particular route that a packet will take to a given target node, if the service bus topology provides multiple such routes. (Note that Response packets in general simply travel along the reverse path of the initial Send packet). In addition, a packet typically also includes a synchronisation code, to allow the start of the packet to be determined, and error detection/correction facilities (e.g. parity, CRC, etc.); again, these are well within the competence of the skilled person. Note that if an error is detected (but cannot be corrected), then the detecting node may request a retransmission of the corrupted packet, or else the received packet may simply be discarded and treated as lost. This will generally then trigger one or more time-outs, as discussed in more detail below.

The architecture of the service bus can be regarded as SP-centric, in that it is intended to provide a route for diagnostic information to accumulate at the service processor. However, one difficulty with this approach is that as communications move up the hierarchy, there is an increasing risk of congestion. This problem is most acute for the portion of the service bus between router chip 202A and service processor 201 (see FIG. 1), which has to carry all communications to and from the service processor. Note that in a large installation there may be hundreds or even thousands of leaf chips attached to the service bus 205, all of which may want to communicate with the service processor 201 (the router chips 202 may also need to initiate transmissions with the service processor 201). Accordingly, it is desirable to regulate the transmission of packets up the hierarchy from the leaf chips 203 to the service processor 201, in order to avoid such congestion.

The standard mechanism for reporting a system problem over the service bus 205 is to raise an interrupt. However, the inter-relationships between various components in a typical system installation may cause propagation of an error across the system. As a result, one fault will frequently produce not just a single interrupt, but rather a whole chain of interrupts, as the original error leads to consequential errors occurring elsewhere in the system. For example, if a storage facility for some reason develops a fault and cannot retrieve some data, then this error condition may be propagated to all processes and/or devices that are currently trying to access the now unavailable data.

Indeed, it is possible for a single fault at one location to cause a thousand or more interrupt signals to be generated from various other locations in a complex installation. In the service bus architecture of FIG. 2 this can potentially lead to severe difficulties, in that a large number of interrupt signals will all try to make their way up to the service processor 201 approximately simultaneously with one another. This may lead to severe congestion and possible blocking on the service bus 205, particularly near to the service processor 201 itself where the greatest concentration of interrupt signals will be experienced.

Figure 3:
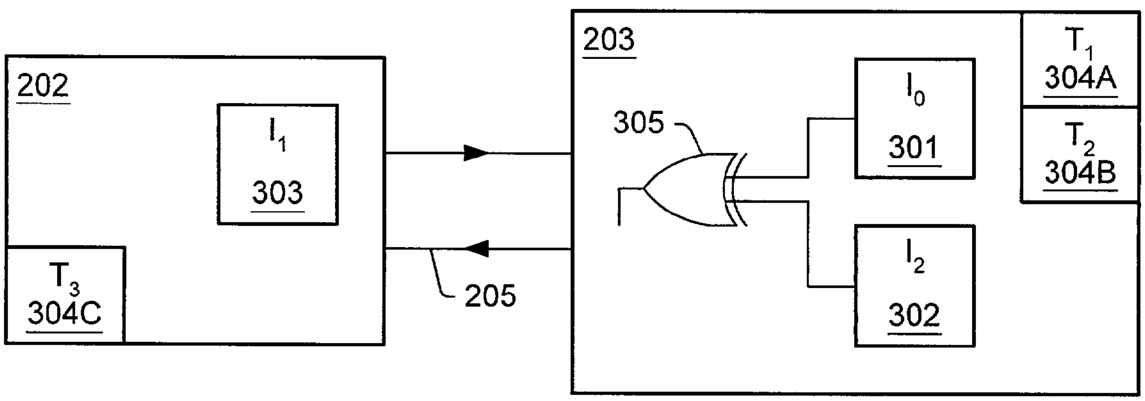
FIG. 3 is a schematic diagram of the interrupt reporting scheme utilised in the service bus of FIG. 2.

FIG. 3 illustrates a mechanism adopted in one embodiment of the invention to regulate the reporting of interrupts from nodes attached to the service bus back up to the service processor 201. Thus FIG. 3 depicts a leaf chip 203 joined to a router chip 202 by service bus 205. Note that in one embodiment the service bus 205 comprises a simple two-wire connection, with one wire providing a downstream path (from parent to child) and the other wire providing an upstream path (from child back to parent). In this configuration, router node 202 serves as the master node, and drives the downstream wire, while leaf chip 203 serves as the slave, and drives the upstream wire. Note that for simplicity and reliability, the packet protocol on this link is based on having only a single transaction pending on any given link at any one time.

Leaf chip 203 includes two flip-flops shown as $I_0$ 301 and $I_2$ 302. The output of these two flip-flops is connected to a comparator 305. Router chip 202 includes a further flip-flop, $I_1$ 303. The state of flip-flop $I_0$ is determined by some interrupt parameter. In other words, $I_0$ is set directly in accordance with whether or not a particular interrupt is raised. The task of $I_1$ is to then try to mirror the state of $I_0$ Thus $I_1$ contains the state that router chip 202 believes currently exists in flip-flop $I_0$ in leaf chip 203. Lastly, flip-flop $I_2$ 302 serves to mirror the state of $I_1$, so that the state of $I_2$ represents what the leaf chip 203 believes is the current state of flip-flop $I_1$ in router chip 202.

It is assumed that initially all three flip-flops, $I_0$, $I_1$, and $I_2$, are set to 0, thereby indicating that no interrupts are present (the system could of course also be implemented with reverse polarity, i.e., with 0 indicating the presence of an interrupt). Note that this is a stable configuration, in that $I_1$ is correctly mirroring $I_0$, and $I_2$ is correctly mirroring $I_1$. We now assume that an interrupt signal is received at flip-flop $I_0$, in other words some hardware component within leaf chip 203 raises an interrupt signal which sets the state of flip-flop $I_0$ so that it is now equal to 1. At this point we therefore have the configuration (1, 0, 0) in $I_0$, $I_1$, and $I_2$ respectively.

Once $I_0$ has been set to indicate the presence of an interrupt, the comparator 305 now detects that there is a discrepancy between the state of $I_0$ and $I_2$, since the latter remains at its initial setting of 0. The leaf chip 203 responds to the detection of this disparity by sending an interrupt packet on the service bus 205 to router chip 202. This transmission is autonomous, in the sense that the bus architecture permits such interrupt packets to be initiated by a leaf node (or router chip) as opposed to just the service processor.

When router chip 202 receives the interrupt packet from leaf chip 203, it has to update the status of flip-flop $I_1$. Accordingly, the value of $I_1$ is changed from 0 to 1, so that we now have the state of (1, 1, 0) for $I_0$, $I_1$, and $I_2$ respectively. Having updated the value of $I_1$, the router chip 202 now sends a return packet to the leaf chip 203 confirming that the status of $I_1$ has indeed been updated. The leaf chip 203 responds to this return packet by updating the value of the flip-flop $I_2$ from 0 to 1. This means that all three of the flip-flops are now set to the value 1. Consequently, the comparator 305 will now detect that $I_0$ and $I_2$ are again in step with one another, having matching values. It will be appreciated that at this point the system is once more in a stable configuration, in that $I_1$ correctly reflects the value of $I_0$, and $I_2$ correctly reflects the value of $I_1$.

In one particular embodiment, the interrupt packet sent from leaf chip 203 to router chip 202 contains four fields. The first field is a header, containing address information, etc, and the second field is a command identifier, which in this case identifies the packet as an interrupt packet. The third field contains the actual updated interrupt status from $I_0$ while the fourth field provides a parity or CRC checksum. The acknowledgement to such an interrupt packet then has exactly the same structure, with the interrupt status now being set to the value stored at $I_1$.

In order to regulate the above operations, a time-out mechanism is provided in leaf chip 203. This provides a timer $T_1$ 304A, which is set whenever an interrupt packet is sent from leaf chip 203 to router chip 202. A typical value for this initial setting of timer $T_1$ might be say 1 millisecond, although this will of course vary according to the particular hardware involved. The timer then counts down until confirmation arrives back from the router chip 202 that it received the interrupt packet and updated its value of the flip-flop $I_1$ accordingly. If however the confirmation packet is not received before the expiry of the time-out period, then leaf chip 203 resends the interrupt packet (and also resets the timer). This process is continued until router chip 202 does successfully acknowledge receipt of the interrupt packet (there may be a maximum number of retries, after which some error status is flagged).

It will be appreciated that removal or resetting of the interrupt occurs in substantially the same fashion as the initial setting of the interrupt. Thus the reset is triggered by flip-flop $I_0$ being returned to 0, thereby indicating that the associated interrupt has been cleared. The comparator 305 now detects that there is a discrepancy between $I_0$ and $I_2$, since the latter is still set to a value of 1. This reflects the fact that from the perspective of the router chip 202, flip-flop $I_0$ is supposedly still set to indicate the presence of an interrupt. As before, this discrepancy results in the transmission of an interrupt signal (packet) from the leaf chip 203 to the router chip 202 over service bus 205, indicating the new status of flip-flop $I_0$ On receipt of this message the router chip updates the value of flip-flop $I_1$ so that it now matches $I_0$. At this point, there is a status of (0, 0, 1) for $I_0$, $I_1$, and $I_2$ respectively.

The router chip 202 now sends a message back to the leaf chip 203 confirming that it has updated its value of $I_1$. (Note that the leaf chip 203 uses the same time-out mechanism while waiting for this confirmation as when initially setting the interrupt). Once the confirmation has been received, this results in the leaf chip updating the value of $I_2$ so that this too is set back to 0. At this point the system has now returned to its initial (stable) state where all the flip-flops ($I_0$, $I_1$, and $I_2$) are set to 0.

The interrupt reporting scheme just described can also be exploited for certain other diagnostic purposes. One reason that this is useful is that interrupt packets are allowed to do certain things that are not otherwise permitted on the service bus (such as originate at a child node). In addition, re-use of interrupt packets for other purposes can help to generally minimise overall traffic on the service bus.

In one embodiment these additional diagnostic capabilities are achieved by use of a second timer $T_2$ 304B within the leaf chip 203. This second timer represents a heartbeat timer, in that it is used to regularly generate an interrupt packet from leaf node 203 to router chip 202, in order to reassure router chip 202 that leaf chip 203 and connection 205 are both properly operational, even if there is no actual change in interrupt status at leaf node 203. Thus if the router chip 202 does not hear from leaf node 203 for a prolonged period, this may be either because the leaf chip 203 is working completely correctly, and so not raising any interrupts, or alternatively it may be because there is some malfunction in the leaf chip 203 and/or the serial bus connection 205 that is preventing any interrupt from being reported. By using the timer $T_2$ to send the interrupt signal as a form heartbeat, the router node can distinguish between these two situations.

Timer $T_2$ is set to a considerably longer time-out period than timer $T_1$, for example 20 milliseconds (although again this will vary according to the particular system). If an interrupt packet is generated due to a change in interrupt status at leaf chip 203, as described above, within the time-out period of $T_2$, then timer $T_2$ is reset. This is because the interrupt packet sent from leaf chip 203 to router chip 202 obviates the need for a heartbeat signal, since it already indicates that the leaf chip and its connection to the router chip are still alive. (Note that dependent on the particular implementation, T2 may be reset either when the interrupt packet is sent from leaf chip 203, or when the acknowledgement is received back from router chip 202).

However, if timer $T_2$ counts down without such an interrupt packet being sent (or acknowledgement received), then the expiry of $T_2$ generates an interrupt packet itself for sending from leaf chip 203 to router chip 202. Of course, the interrupt status at leaf chip 203 has not actually changed, but the transmission of the interrupt packet on expiry of $T_2$ serves two purposes. Firstly, it acts as a heartbeat to router chip 202, indicating the continued operation of leaf chip 203 and connection 205. Secondly, it helps to maintain proper synchronisation between $I_0$, $I_1$, and $I_2$, in case one of them is incorrectly altered at some stage, without this change otherwise being detected.

In order to make use of the heartbeat signal from leaf chip 203, a timer $T_3$ 304C is added into to the router chip 202. This timer is reset each time an interrupt packet (and potentially any other form of packet) from the leaf chip 203 is received at the router chip 202. The time-out period at this timer is somewhat longer than the heartbeat time-out period set for $T_2$ at leaf node 203, for example, thirty milliseconds or more. Providing another interrupt packet is received within this period, then timer $T_3$ on the router chip 202 is reset, and will not reach zero.

However, if no further interrupt packets are received from leaf chip 203, then this timer will count down to zero (i.e. it will time-out). In this case the router chip knows that there is some problem with the connection 205 and/or with the leaf chip itself 203. This is because when everything is properly operational, it is known that leaf chip 203 will generate at least one interrupt packet within the heartbeat period, as specified by $T_2$. In contrast, the expiry of $T_3$ indicates that no interrupt packet has been received from leaf chip 203 within a period significantly longer than the heartbeat interval (assuming of course that $T_3$ is properly set in relation to $T_2$). At this point, the router chip 202 can perform the appropriate action(s) to handle the situation. This may include setting an interrupt status within itself, which in turn will lead to the situation being reported back to the service processor 201 (as described below).

As well as providing a heartbeat signal, the interrupt packets can also be used for testing signal integrity over connection 205. This can be done by reducing the setting of timer $T_2$ from its normal or default value to a much shorter one, say 20 microseconds (note that if the reset of $T_2$ is triggered by the transmission of an interrupt packet from leaf chip 203, rather than by the receipt of the following acknowledgement, the setting of $T_2$ for this mode of testing should allow time for this acknowledgement to be received). This then leads to a rapid exchange of interrupt packets and acknowledgements over 205, at a rate increased by a factor of about 1000 compared to the normal heartbeat rate. This represents a useful testing exercise, in that if connection 205 is able to adequately handle transmissions at this very high rate, then it should not have difficulty with the much lower rate of normal interrupt reporting and heartbeat signals. Note that such testing and the setting of timer T2 are performed under the general control of the service processor 201.

Figure 4:
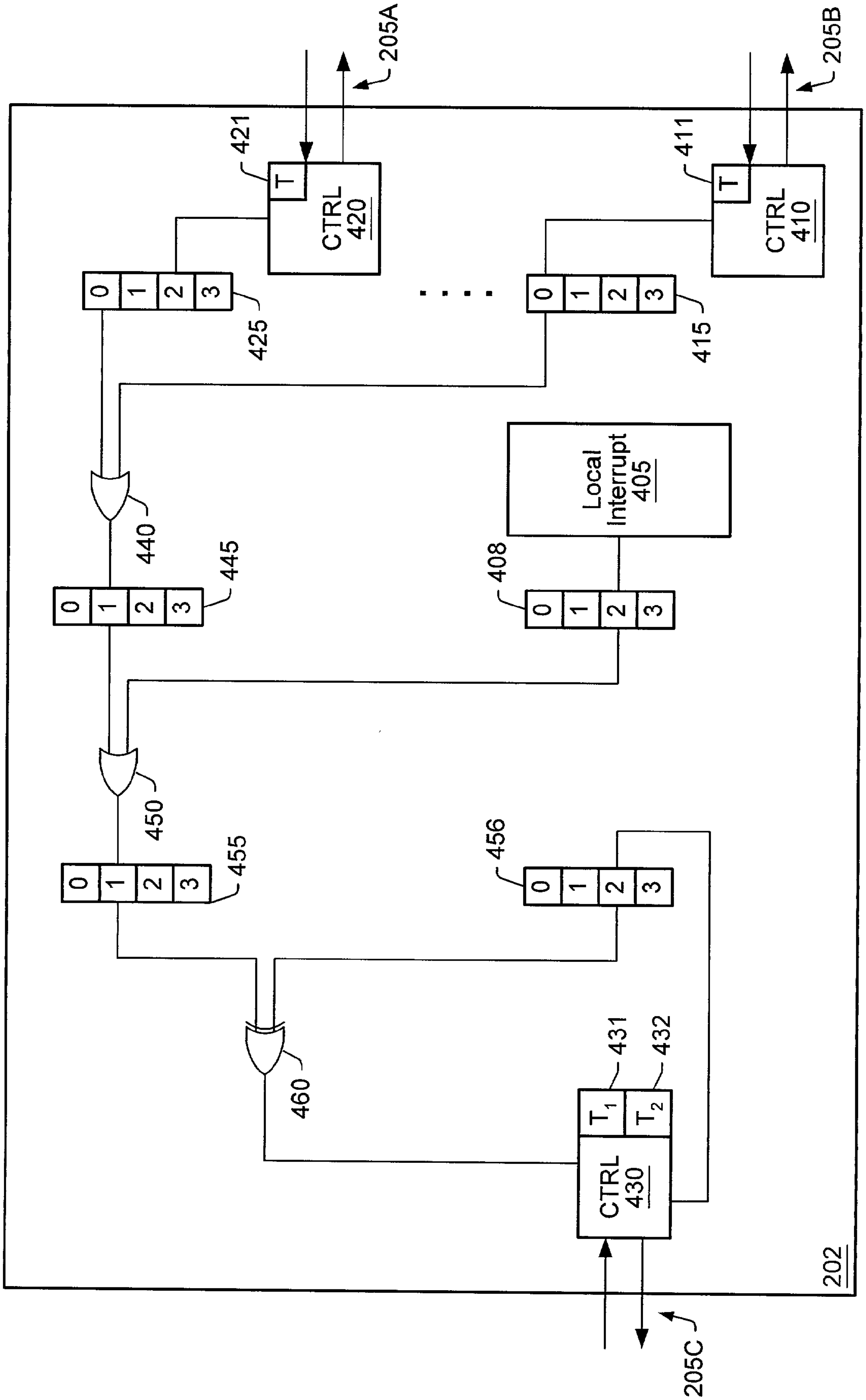
FIG. 4 is a schematic diagram illustrating in more detail the interrupt reporting scheme utilised in the service bus of FIG. 2.

FIG. 4 illustrates the approach of FIG. 3 applied in a more complex configuration. Thus FIG. 4 illustrates a router chip 202 that is connected to multiple chips or nodes lower down in the service bus hierarchy (i.e. router chip 202 is the master for each of these downstream links). The router chip supports four levels of interrupt, which are typically assigned to different priority levels of interrupt. For example, the top priority level may need an urgent resolution if processing is to continue, while the bottom priority level may simply be reporting an event that does not necessarily represent an error (such as the need to access data from external storage). These four interrupt levels will generally also be supported by the other nodes in the service bus hierarchy.

In the embodiment shown in FIG. 4, router chip 202 has two connections 205*a* and 205*b* from below it in the hierarchy, but it will be appreciated that any given router chip may have more (or indeed fewer) such connections. Links 205*a* and 205*b* may connect to two leaf nodes, or to two other router nodes lower down in the hierarchy of the service bus than router node 202. Furthermore, not all links coming into router node 202 need originate from the same type of node; for example link 205*a* may be coming from a router node, while link 205*b* may be coming from a leaf node.

Each incoming link is terminated by a control block, namely control block 410 in respect of link 205*b* and control block 420 in respect of link 205*a*. The control blocks perform various processing associated with the transmission of packets over the service bus 205, for example adding packet headers to data transmission, checking for errors on the link, and so on. Many of these operations are not directly relevant to an understanding of the present invention and so will not be described further, but it will be appreciated that they are routine for the person skilled in the art. Note that control units 410 and 420 each contain a timer, denoted 411 and 421 respectively. These correspond to timer T3 304C in FIG. 3, and are used in relation to the heartbeat mechanism, as described above.

Associated with each control block 410, 420 is a respective flip-flop, or more accurately respective registers 415, 425, each comprising a set of four flip-flops. These registers correspond to the flip-flop $I_1$ shown in FIG. 3, in that they hold a value representing the interrupt status that according to the router chip is currently presumed to be present in the node attached to the associated link 205A or 205B. Since each of the four interrupt levels is handed independently in the configuration of FIG. 4, there are effectively four flip-flops in parallel for each of registers 415 and 425.

As previously described in relation to FIG. 3, a control unit 410 or 420 in router chip 202 may receive an interrupt packet over its associated link. In response to this received packet, the control unit extracts from the interrupt packet the updated status information, and then provides its associated flip-flops with the new interrupt status information. Thus control unit 410 updates the flip-flops in register 415, or control block 420 updates the flip-flops in register 425, as appropriate. The control unit also transmits an acknowledgement packet back to the node that originally sent the incoming interrupt packet, again as described above.

Once router chip 202 has received interrupt status information from nodes below it in the hierarchy, it must of course also be able to pass this information up the hierarchy, so that it can make its way to the service processor 201. In order to avoid congestion near the service processor, an important part of the operation of the router node 202 is to consolidate the interrupt information that it receives from its child nodes. Accordingly, the interrupt values stored in registers 415 and 425 (plus any other equivalent units if router node 202 has more than two child nodes) are fed into OR gate 440, and the result is then passed for storage into register 445. Register 445 again comprises four flip-flops, one for each of the different interrupt levels, and the consolidation of the interrupt information is performed independently for each of the four interrupt levels.

Consequently, register 445 presents a consolidated status for each interrupt level indicating whether any of the child nodes of router chip 202 currently has an interrupt set. Indeed, as will later become apparent, register 445 in fact represents the consolidated interrupt status for all descendant nodes of router chip 202 (i.e. not just its immediate child nodes, but their child nodes as well, and so on down to the bottom of the service bus hierarchy).

It is also possible for router node 202 to generate its own local interrupts. These may arise from local processing conditions, reflecting operation of the router node itself (which may have independent functionality or purpose over and above its role in the service bus hierarchy). Alternatively (or additionally), the router node may also generate a local interrupt because of network conditions, for example if a heartbeat signal such as discussed above fails to indicate a live connection to a child node.

The locally generated interrupts of the router chip 202, if any, are produced by local interrupt unit 405, which will be described in more detail below, and are stored in the block of flip-flops 408. Again it is assumed that there are four independent levels of interrupt, and accordingly register 408 comprises four individual flip-flops.

An overall interrupt status for route noder 202 can now be derived based on (a) a consolidated interrupt status for all of its child (descendant) nodes, as stored in register 445; and (b) its own locally generated interrupt status, as stored in register 408. In particular, these are combined, via OR gate 450 and the result stored in register 455. As before, the four interrupt levels of are handled independently, so that OR gate 450 in fact represents four individual OR gates operating in parallel, one for each interrupt level.

The results of this OR operation are stored in register 455, and correspond in effect to the value of $I_0$ for router node 202, as described in relation to FIG. 3. Thus register 455 serves to flag the presence of any interrupt either from within router node 202 itself, or from any of its descendant nodes.

Router chip 202 further includes a register 456 comprising four flip-flops, which are used in effect to store the value of $I_2$ (see FIG. 3), one for each of the four interrupt levels. The outputs from registers 455 and 456 (corresponding to $I_0$ and $I_2$ respectively) are then combined via comparator 460, and the result fed to control unit 430. As discussed in relation to FIG. 3, if a disparity is found, in other words, if control unit 430 receives a positive signal from the comparator 460, then an interrupt signal is generated by control unit 430. This is transmitted over link 205C to the parent node of route node 202. Again control unit 430 contains appropriate logic for generating the relevant packet structure for such communications.

Router chip 202 therefore acts both as a parent node to receive interrupt status from lower nodes, and also as a child node in order to report this status further up the service bus hierarchy. Note that the interrupt status that is reported over link 205C represents the combination of both the locally generated interrupts from router chip 202 (if any), plus the interrupts received from its descendant nodes (if any).

After the interrupt packet triggered by a positive signal from comparator 460 is transmitted upstream, a response packet should be received in due course over link 205C. This will contain an updated value of $I_1$ (see FIG. 3). Control unit 430 then writes this updated value into register 456, which should eliminate the disparity between registers 455 and 456 that caused the interrupt packet to be originally sent. Consequently, the configuration is now in a stable situation, at least until another interrupt is generated (or cleared/masked, as described in more detail below).

The control unit 430 also includes timers $T_1$ 431 and $T_2$ 432, whose function has already been largely described in relation to FIG. 3. Thus timer $T_1$ is initiated whenever an interrupt packet is transmitted over link 205C, and is used to confirm that an appropriate acknowledgement is received from the parent node within the relevant time-out period, while timer $T_2$ is used to generate a heartbeat signal.

The skilled person will be aware that there are many possible variations on the implementation of FIG. 4. For example, other systems may have a different number of independent interrupt levels from that shown in FIG. 4, and a single control unit may be provided that is capable of handling all incoming links from the child nodes of route node 202.

It is also possible to implement timers T1 and T2 by a single timer for the standard mode of operation. This single timer then has two settings: a first, which is relatively short, is used to drive packet retransmission in the absence of an acknowledgement, and the second, relatively long, is used to drive a heartbeat signal. One mechanism for controlling the timer is then based on outgoing and incoming transmissions, whereby sending an interrupt packet (re)sets timer 431 to its relatively short value, while receiving an acknowledgement packet (re)sets the timer 431 to its relatively long value. Alternatively, the timer may be controlled by a comparison of the values of $I_0$ and $I_2$, in that if these are (or are changed to be) the same, then the longer time-out value is used, while if these are (or are changed to be) different, then the shorter time-out value is used.

A further possibility is that node 202 does not have any locally generated interrupts, so that block 405 and register 408 are effectively missing. Conversely, if node 202 is a leaf chip node, then there will be no incoming interrupt status to forward up the service bus hierarchy, hence there will be no interrupts received at gate 440, which can therefore be omitted. In either of these two cases it will be appreciated that gate 450 also becomes redundant and the interrupt status, whether locally generated or from a child node, can be passed directly onto register 455.

It will also be recognised that while registers 445 and 408 have been included in FIG. 4 to aid exposition, they are in fact unnecessary from a signal processing point of view, in that there is no need to formally store the information contained in them. Rather, in a typical implementation, the output of register 440 would be fed directly into gate 450 without intermediate storage by flip-flops 445, and likewise the interrupt status from block 405 would also be fed directly into gate 450 without being stored by intermediate flip-flops 408. Many other variations on the implementation of FIG. 4 will be apparent to the skilled person.

Figure 5A:
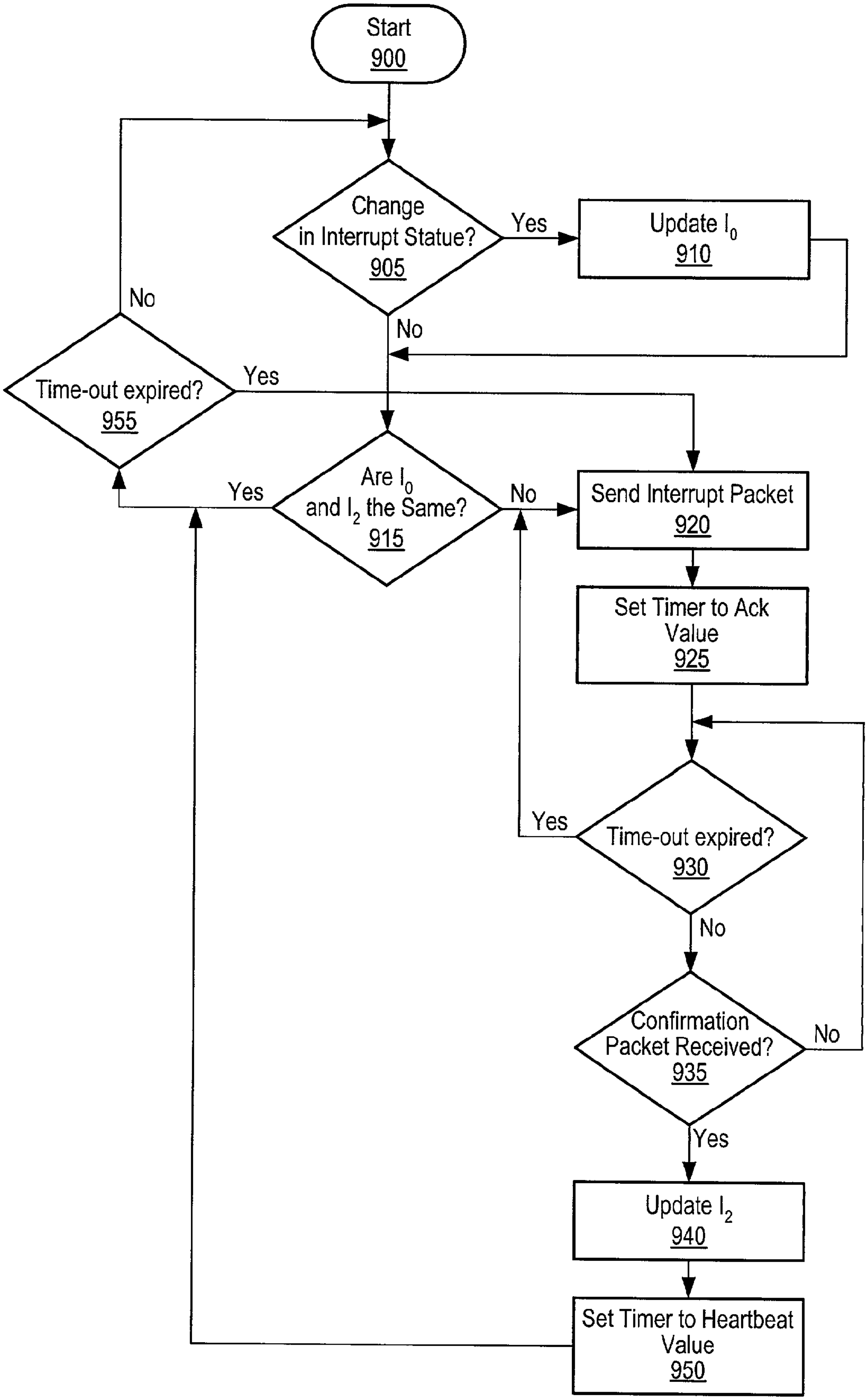
FIGS. 5A and 5B are flowcharts illustrating the processing performed by a child node and parent node respectively in the interrupt reporting scheme of FIG. 3.
Figure 5B:
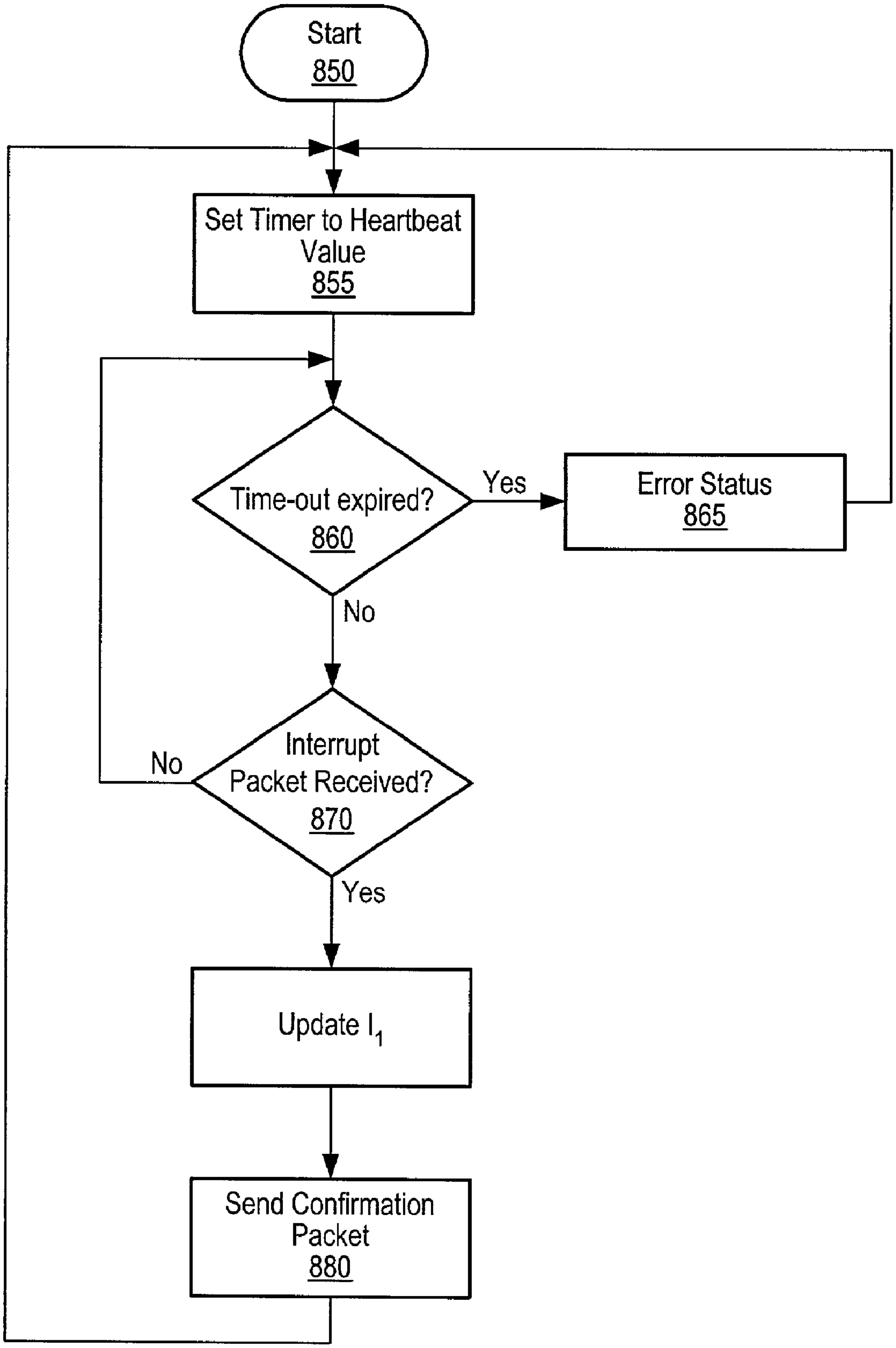

FIG. 5 is a flow chart illustrating the interrupt processing described above, and in particular the transmission of an interrupt status from a child (slave) node to a parent (master) node, such as depicted in FIG. 3. More especially, FIG. 5A represents the processing performed at a child node, and FIG. 5B represents the processing performed at a parent node. Note that for simplicity, these two flow charts are based on the assumption that there is only one interrupt level for each node, and that the two time-outs on the child node are implemented by a single timer having two settings (as described above).

The processing of FIG. 5A commences at step 900. It is assumed here that the system is initially in a stable configuration, i.e., $I_0$, $I_1$ and $I_2$ all have the same value. It is also assumed that the timer is set to its long (heartbeat) value. The method then proceeds to step 905 where it is detected that there is a change in interrupt status. As shown in FIG. 4, this change may arise either because of a locally generated interrupt, or because of an interrupt received from a descendant node. If such a change is indeed detected then the value of $I_0$ is updated accordingly (step 910). Note that this may represent either the setting or the clearing of an interrupt status, depending on the particular initial configuration at start 900. (In this context clearing includes masking out of the interrupt, as described below in relation to FIG. 6, since the latter also changes the interrupt status as perceived by the rest of the node).

The method now proceeds to step 915 where a comparison is made as to whether or not $I_0$ and $I_2$ are the same. If $I_0$ has not been updated (i.e., step 910 has been bypassed because of a negative outcome to step 905), then $I_0$ and $I_2$ will still be the same, and so processing will return back up to step 905 via step 955, which detects whether or not the timer, as set to the heartbeat value, has expired. This represents in effect a wait loop that lasts until a change to interrupt status does indeed occur, or until the system times out.

In either eventuality, processing then proceeds to send an interrupt packet from the child node to the parent node (step 920). As previously described, the interrupt packet contains the current interrupt status. Note that if step 920 has been reached via a positive outcome from step 955 (expiry of the heartbeat timer), then this interrupt status should simply repeat information that has previously been transmitted. On the other hand, if step 920 has been reached via a negative outcome from step 915 (detection of a difference between $I_0$ and $I_2$), then the interrupt status has been newly updated, and this update has not previously been notified to the parent node.

Following transmission of the interrupt packet at step 920, the timer is set (step 925), to its acknowledgement value. A check is now made to see whether or not this time-out period has expired (step 930). If it has indeed expired, then it is assumed that the packet has not been successfully received by the parent node and accordingly the method loops back up to step 920, which results in the retransmission of the interrupt packet. On the other hand, if the time-out period is still in progress, then the method proceeds to step 935 where a determination is made as to whether or not a confirmation packet has been received. If not, the method returns back up to step 930. This loop represents the system in effect waiting either for the acknowledgement time-out to expire, or for the confirmation packet to be received from the parent node.

Note that if a confirmation packet is received, but is incorrect because some error is detected but cannot be corrected by the ECC, then the system treats such a confirmation packet as not having been received. In this case therefore, the interrupt packet is resent when the time-out expires at step 930. Another possible error situation arises if the returned value of $I_1$ does not match $I_0$, but the received packet is otherwise OK (the ECC is correct). This is initially handled as a correctly received packet, but will subsequently be detected when the method reaches step 915 (as described below).

Assuming that the confirmation packet is indeed correctly received before the expiry of the acknowledgement time-out, then step 935 will have a positive outcome, and the method proceeds to update the value of $I_2$ appropriately (step 940). This updated value should agree with the value of $I_0$ as updated at step 910, and so these two should now match one another again. The method can now loop back to the beginning, via step 950, which resets the timer to its heartbeat value, and so re-enters the loop of steps 955, 905 and 915. A stable configuration, analogous to the start position (albeit with an updated interrupt status) has therefore been restored again.

One potential complication is that, as previously mentioned, a given node may have two or more parent nodes, in order to provide redundancy in routing back to service processor. Assuming that the service processor has knowledge of the current status of each node (whether or not it is functional), it may direct a child node to report all interrupts to a particular parent node if another parent is not functional at present. Alternatively, the child node may direct an interrupt packet first to one parent, and then only to another parent if it does not receive a confirmation back from the first parent in good time. Yet another possibility is for the child node to simply report any interrupt to both (all) of its parents at the substantially same time. This does mean that a single interrupt may be reported back twice to the service processor, but due to the consolidation of interrupt signals at higher levels of the service bus architecture, any resultant increase in overall network traffic is unlikely to be significant. (Note that such duplicated interrupt reporting does not cause confusion at the service processor, since the original source of each interrupt still has to be determined, as described below in relation to FIG. 7).

Figure 7:
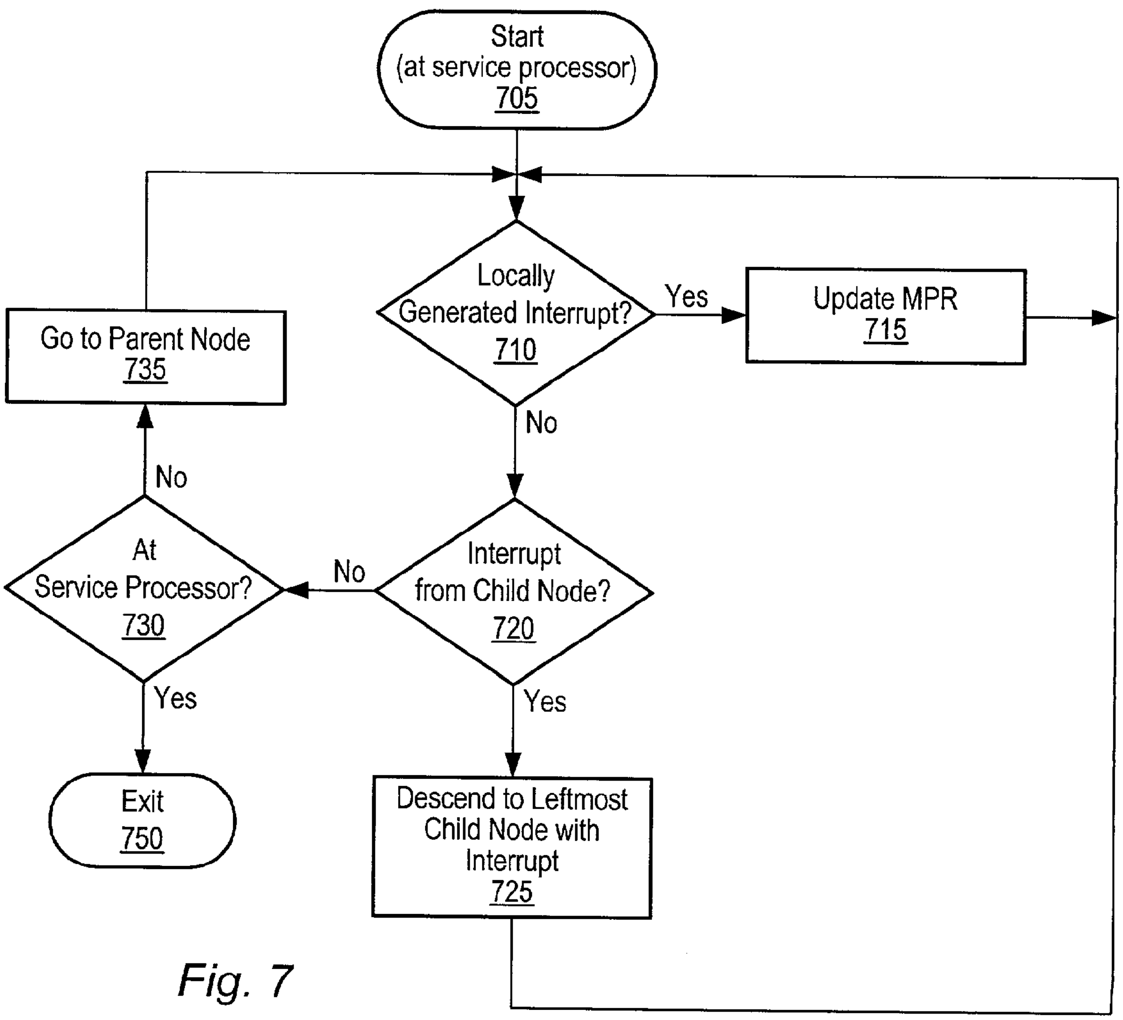
FIG. 7 is a flowchart illustrating the method adopted in one embodiment of the invention for masking interrupts on the service bus of FIG. 2.

It should also be noted there is only a single interrupt status (per level), even although there may be multiple interrupt sources (from local and/or from child nodes). For example, in FIG. 4, flip-flop 455 effectively stores the interrupt status for the whole node. Consequently, even if various interrupt sources trigger one after another, only the first of these is effective in altering the interrupt status at steps 905/910, and so only a single interrupt packet (per level) is sent, until the masking operation described below in relation to FIG. 7 is performed. This reduces network traffic, and also simplifies timing considerations for operations in the control logic of the node (e.g. if two interrupts trigger in rapid succession, only the first of these is effectively reported, since the second will not actually change the interrupt status to be communicated to the parent node).

FIG. 5B illustrates the processing that is performed at the parent node, in correspondence with the processing at the child node depicted in FIG. 5A. The method commences at step 850, where it is again assumed that the system is in a stable initial configuration. In other words, it is assumed that the value of $I_1$ maintained at the parent node matches the values of $I_0$ and $I_2$ as stored at the child node.

The method then proceeds to step 855 where a timer is set. The purpose of this timer, as previously described, is to monitor network conditions to verify that the link to the child node is still operational. Thus a test is made at step 860 to see whether or not the time-out period of the timer has expired. If so, then it is assumed that the child node and/or its connection to the parent node has ceased proper functioning, and the parent node generates an error status (typically in the form of a locally generated interrupt) at step 865. This then allows the defect to be reported up the service bus to the service processor.

If at step 860 the time-out period has not yet expired, then a negative outcome results, and the method proceeds to step 870. Here, a test is made to see whether or not an interrupt packet has been received from the child node. If no such packet has been received then the method returns back again to step 860. Thus at this point the system is effectively in a loop, waiting either for an interrupt packet to be received, or for the time-out period to expire.

(Note that while the processing of steps 860 and 870 is shown as a loop, where one test follows another in circular fashion, the underlying implementation may be somewhat different, as for example is the case in the embodiment of FIG. 4. Thus rather than performing a processing loop per se, the system typically sits in idle or wait state pending further input, whether this be a time-out or an interrupt packet, and then processes the received input accordingly. Note that other processing loops in FIGS. 5A and 5B, as well as in FIG. 7 below, can be implemented in this manner).

Assuming that at some stage an interrupt packet is indeed received (as sent by the child node at step 920 of FIG. 5A), then the method proceeds to step 875, where the value of $I_1$ stored in the parent node is updated. The updated value of $I_1$ therefore now matches the value of $I_0$ as stored at the child node, and as communicated in the received interrupt packet. The parent node then sends a confirmation packet back to the child node, notifying it of the update to $I_1$ (step 880). This allows the child node to update the value of $I_2$ (see steps 935 and 940 in FIG. 5*a*).

As previously discussed, the precise contents of the interrupt packet sent at step 920 in FIG. 5A, and of the confirmation packet sent at step 880 in FIG. 5B, will vary according to the particular implementation. Nevertheless, it is important for the parent node to be able to handle repeated receipt of the same interrupt status, for example because an acknowledgement packet failed on the network, leading to a re-transmission of the original update, or because an interrupt packet was sent due to the expiry of the heartbeat timer, rather than due to an updated interrupt status. This can be accommodated in a relatively straightforward manner by the interrupt packet containing the new setting of the interrupt status (as per $I_0$), rather than a difference or delta to the previous setting, since now $I_1$ will end up with the correct new setting for the interrupt status, even if the update packet is applied more than once.

In one embodiment, for a system that supports four interrupt levels, the interrupt packet simply includes a four-bit interrupt status. In other words, each interrupt packet contains a four-bit value representing the current (new) settings for the four different interrupt levels, thereby allowing multiple interrupt levels to be updated simultaneously. However, other approaches could be used. For example, an interrupt packet could specify which particular interrupt level(s) is (are) to be changed. A relatively straightforward scheme would be to update only a single interrupt level per packet, since as previously discussed it is already known that there is only one such interrupt packet per level (until all the interrupts for that level are cleared).

Note that the processing of FIG. 5B makes no attempt to forward the incoming interrupt packet itself up the service bus network. Rather, a router node sets its own internal state in accordance with an incoming packet as explained in relation to FIG. 4 above, and if appropriate this may then result in a subsequent (new) interrupt packet being created for transmission to the next level of the hierarchy (dependent on whether or not the router node already has an interrupt status). Thus individual interrupt packets (and also their confirmations) only travel across single node-node links, thereby reducing traffic levels on the service bus.

It will be appreciated that the interrupt scheme of FIGS. 3, 4 and 5 is sufficiently low-level to provide the robust reporting of interrupts, even in the presence of hardware or software failures. For example, a node may still be able to report an interrupt even in the presence of a serious malfunction. A further degree of reliability is provided because the reporting of an interrupt from any given node is independent of whether or not any other nodes are operating properly (accept for direct ancestors of the reporting node, and even here redundancy can be provided as previously mentioned).

Figure 6:
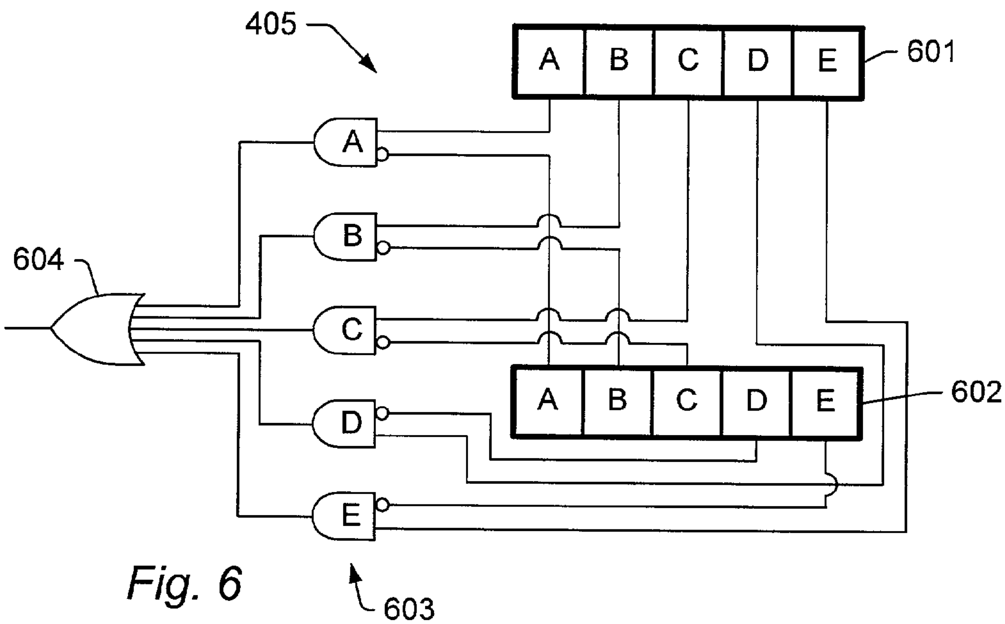
FIG. 6 is a diagram illustrating the local interrupt unit of FIG. 4 in more detail.

FIG. 6 illustrates in more detail the local interrupt unit 405 from FIG. 4, which is the source of locally generated interrupts. Note that an analogous structure is also used for locally generated interrupts at leaf chips (i.e. the same approach is used for both leaf chips and router chips).

Unit 405 includes four main components: an interrupt status register (ISR) 601; a mask pattern register (MPR) 602; a set of AND gates 603; and an OR gate 604. The interrupt status register 601 comprises multiple bits, denoted as a, b, c, d and e. It will be appreciated that the five bits in ISR 601 in FIG. 6 are illustrative only, and that the ISR may contain fewer or more bits.

Each bit in the ISR 601 is used to store the status of a corresponding interrupt signal from some device or component (not shown). Thus when a given device or component raises an interrupt, then this causes an appropriate bit of interrupt status register 601 to be set. Likewise, when the interrupt is cleared, then this causes the corresponding bit in ISR 601 to be cleared (reset). Thus the interrupt status register 601 directly tracks the current interrupt signals from corresponding devices and components as perceived at the hardware level.

The mask pattern register 602 also comprises multiple bits, denoted again as a, b, c, d, and e. Note that there is one bit in the MPR for each bit in the interrupt status register 601. Thus each bit in the ISR 601 is associated with a corresponding bit in the MPR 602 to form an ISR/MPR bit pair (601*a* and 602*a*; 601*b* and 602*b*; and so on).

An output is taken from each bit in the ISR 601 and from each bit in the MPR 602, and corresponding bits from an ISR/MPR bit pair are passed to an associated AND gate. (As shown in FIG. 6, each output from the MPR 602 is inverted before reaching the relevant AND gate).

Thus for each pair of corresponding bits in the ISR 601 and MPR 602 there is a separate AND gate 603. For example, ISR bit 601 a and MPR bit 602*a* are both connected as inputs to AND gate 603*a*; ISR bit 601*b* and MPR bit 602*b* are connected as the two inputs to AND gate 603*b*; and so on for the remaining bits in the ISR and MPR registers. Note that the values of the bits within the MPR can also be read (and set) by control logic within a node (not shown in FIG. 6), and this control logic can also read the values of the corresponding ISR bits.

The set of AND gates 603 are connected at their outputs to a single OR gate 604. The output of this OR gate is in turn connected to flip-flop 408 (see FIG. 4). It will be appreciated that this output represents one interrupt level only; in other words, the components of FIG. 6 are replicated for each interrupt level. Note that the number of bits within ISR 601 and MPR 602 may vary from one interrupt level to another.

The result of the configuration of FIG. 6 is that an interrupt is only propagated out of the interrupt unit 405 if both the relevant ISR bit is set (indicating the presence of the interrupt), and also the corresponding MPR bit is not set (i.e. it is zero). Thus, any interrupt that has the corresponding MPR bit set is effectively discarded by the AND gates 603, which filter out those interrupts for which the corresponding MPR bit 602 is unity. Thus the MPR 602 can be used, as its name suggests, to mask out selected interrupt bits.

(It will be appreciated that the mask could of course be implemented using reverse polarity, in which case it would perhaps better be regarded as an interrupt enable register. In such an implementation, a zero would be provided from register 602 to disable or mask an interrupt, and a one to enable or propagate an interrupt. Note that with this arrangement, the inverters between the AND gates 603 and the register 602 would be removed).

The OR gate 604 provides a single output signal that represents a consolidated status of all the interrupt signals that have not been masked out. In other words, the output from OR gate 604 indicates an interrupt whenever at least one ISR bit is set without its corresponding MPR bit being set. Conversely, OR gate 604 will indicate the absence of an interrupt if all the interrupts set in ISR 601 (if any) are masked out by MPR 602 (i.e., the corresponding bits in MPR 602 are set).

One motivation for the configuration of FIG. 6 can be appreciated with reference back to the architecture of the service bus as illustrated in FIG. 2. Thus as interrupts are propagated up the hierarchy from leaf chips through routing chips and finally to the service processor, the identity of the original source or location of the interrupt is not maintained. For example, if an (unmasked) interrupt is raised by leaf chip 203, this is notified to router chip 202F, which then passes the interrupt on to router chip 202E, and from there it goes to router chip 202B, router chip 202A, and finally to service processor 201. However by the time it arrives at service processor 201, the service processor only knows that the interrupt came from router chip 202A; in other words, the history of the interrupt signal prior to arrival at router chip 202A is transparent or hidden from the service processor 201.

The reason for this is to minimise congestion at the top of the service bus hierarchy. Thus even although multiple nodes below router chip 202*a* may be raising interrupt signals, these are consolidated into just a single signal for passing on to service processor 201. In this way, the message volume over the service bus 205 is greatly reduced at the top of the hierarchy to try to avoid congestion.

However it will be appreciated that the decrease in traffic on the service bus is at the expense of an effective loss of information, namely the details of the origin of any given interrupt. Therefore, in one embodiment of the invention a particular procedure is adopted to allow the service processor 201 to overcome this loss of information, so that it can properly manage interrupts sent from all the various components of the computer installation.

One factor underlying this procedure is that once an interrupt has been raised by a particular device or component, then this device or component will frequently generate multiple successive interrupt signals. However, these subsequent interrupts are usually of far less interest than the initial interrupt signal. The reason for this is that the initial interrupt signal indicates the presence of some error or malfunction, and it is found that such errors then often continue (in other words further interrupt signals are received) until the underlying cause of the error can be rectified.

Thus in one embodiment of the present invention, the procedure depicted in FIG. 7 is used by the service processor 201 to analyse and subsequently clear interrupts raised by various nodes. The flowchart of FIG. 7 commences at step 705 where control initially rests at the service processor 201. The method now proceeds to step 710 where a test is made to see if there are any locally generated interrupts, as opposed to any interrupts that are received at the node from one of its child nodes. In other words, for a router chip we would be looking for interrupts in flip-flop 408, but not in flip flop 445 (see FIG. 4). Of course, for a leaf chip all interrupts must be locally generated since it has no child nodes.

Having started at the service processor, it is assumed that there are no locally generated interrupts at step 710 so we progress to step 720, where a test is made to see if there are any interrupts that are being received from a child node. Referring back again to FIG. 4 this would now represent any interrupts stored in flip-flop 445, rather than in flip-flop 408. Assuming that such an interrupt signal from a child node is indeed present (which would typically be why the service processor initiated the processing of FIG. 7), we now proceed to step 725, where we descend the service bus hierarchy to the leftmost child node that is showing an interrupt (leftmost in the sense of the hierarchy as depicted in FIG. 2, for example). Thus for service processor 201, this would mean going to router chip 202A.

Having descended to the next level down in the service bus hierarchy, the method loops back up to step 710. Here a test is again performed to see if there are any locally generated interrupts. Let us assume for the purposes of illustration that the only node that is actually locally generating an interrupt signal at present is leaf chip 203B. Accordingly, test 710 will again prove negative. Therefore, we will then loop around the same processing as before, descending one level for each iteration through router chips 202B, 202E, and 202F, until we finally reach leaf chip 203B.

At this point the test of step 710 will now give a positive outcome, so that processing proceeds to step 715. This causes the control logic of the node to update the MPR 602 to mask out a locally generated interrupt signal. More particularly, it is assumed that just a single interrupt signal is masked out at step 715 (i.e., just one bit in the MPR 602 is set). Accordingly, after this has been performed, processing loops back to step 710 to see if there are still any locally generated interrupts. If this is the case, then these further interrupts will be masked out by updating the mask register one bit at a time at step 715. This loop will continue until all the locally generated interrupts at the node are masked out.

Note that the decision of which particular bit in the MPR to alter can be made in various ways. For example, it could be that the leftmost bit for which an interrupt is set could be masked out first (i.e. bit a, then bit b, then bit c, and so as depicted in FIG. 6). Alternatively, the masking could start at the other end of the register, or some other selection strategy, such as a random bit selection, could also be adopted. A further possibility is to update the mask register to mask all the interrupt signals at the same time. In other words if (for example) ISR bits 601A, 601B and 601D, are all set, then at step 715, the MPR could be updated so that bits 602A, 602B, and 602D are all likewise set in a single step. If desired, the flow of FIG. 7 could then be optimised so that the outcome of step 715 progresses directly to step 720, since it is known in this case that after step 715, step 710 will always be negative (there are no more locally generated interrupt signals).

It will be appreciated that at the same time as the control logic of the node updates the MPR in step 715, it typically reads the ISR status. It can then report the particular interrupt that is being cleared up to the service processor, and/or perform any other appropriate action based on this information. Note that such reporting should not now overload the service bus 205 because it is comparatively controlled. In other words, the service processor should receive an orderly succession of interrupt signal reports, as each interrupt signal is processed in turn at the various nodes.

It will also be noted that at this point the interrupts themselves have not been cleared, rather they have just been masked out. This is because, as mentioned earlier, there may well be a re-occurrence of same error very quickly (due to the same underlying malfunction), resulting in the interrupt signal being set once again. Consequently, clearing of the interrupt signal itself in ISR 601 is deferred until suitable remedial or diagnostic action has been taken (not shown in FIG. 7). Typically this may involve the service processor sending commands over the service bus to the relevant node, firstly to obtain status information (such as details of the interrupt) in a response packet from the node, and potentially then to update control information as appropriate within the node.

This strategy therefore prevents flooding the service processor with repeated instances of the same interrupt signal (derived from the same ongoing problem), since these which are of relatively little use to the service processor for diagnostic purposes, but at the same time allows the system to be re-sensitised to other interrupts from that node. Note that when the interrupt signal is eventually cleared, then the corresponding MPR bit is likewise cleared or reset back to zero (not shown in FIG. 7) in order to allow the system to be able to trigger again on the relevant interrupt.

Once all the locally generated interrupts have been cleared at step 710 then we proceed to step 720 where it is again determined if there are any interrupt signals present from a child node. Since we are currently at leaf chip 203B, which does not have any child nodes, then this test is now negative, and the method proceeds to step 730. Here it is tested to see whether or not we are at the service processor itself. If so, then there are no currently pending interrupts in the system that have not yet been masked out, and so processing can effectively be terminated at step 750. (It will be appreciated that at this point the service processor can then determine the best way to handle those interrupts that are currently masked out).

However, assuming at present that we are still at leaf chip 203B, then step 730 results in a negative outcome, leading to step 735. This directs us to the parent node of our current location, i.e., in this particular case back up to router chip 202F. (Note that if a child node can have multiple parents, then at step 735 any parent can be selected, although returning to the parent through which the previous descent was made at step 725 can be regarded as providing the most systematic approach).

We then return to step 710, where it will be again determined that there are no locally generated interrupts at router chip 202F, so we now proceed to step 720. At this point, the outcome of step 720 for router chip node 202F is negative, unlike the previous positive response for this node. This is because the interrupt(s) at leaf chip 203B has now been masked out, and this is reflected in the updated contents of flip-flop 445 for the router chip (see FIG. 4). In other words as locally generated interrupts are masked out at step 715, this change in interrupt status propagates up the network, and the interrupt status at higher levels of the service bus hierarchy is automatically adjusted accordingly.

(It will be appreciated that if leaf chip 203C also has a pending interrupt, then router chip 202F would maintain its interrupt status even after the interrupt(s) from leaf chip 203B had been cleared. In this case, when the test of step 720 was performed for router chip 202F, then it would again be positive, and this would lead via step 725 to leaf chip 203C, to clear the interrupts stored there).

Assuming now that there are no longer any child nodes of router node 202F with pending interrupts, then step 720 will have a negative outcome. Consequently, the method will loop through step 730, again taking the negative outcome because this is not the service processor. At step 735 processing will then proceed to parent router chip node 202E.

Providing that there no further interrupts present in the service bus, the same loop of steps 710, 720, 730 and 735 will be followed twice more, as we ascend through router chip 202B and router chip 202A, before eventually reaching service processor 201. At this point, step 730 results in a positive outcome, leading to an exit from the method at step 750, as previously described.

Thus the procedure described by the flowchart of FIG. 7 allows the interrupt signals to be investigated in an ordered and systematic manner, even if the service bus architecture is complex and contains many nodes. In addition the amount of traffic that is directed to the service processor 201 is carefully regulated, so that one and only one report of any given interrupt signal is received, this being from the node at which the signal is locally generated. The interrupt signal is thereafter masked out until the service processor can perform an appropriate remedial action.

In one embodiment, the processing of FIG. 7 is generally coordinated by the service processor. Thus the results of the test of step 720 are reported back to the service processor, which then determines which node should be processed next. In particular, if the report back to the service processor indicates that there are interrupts to be cleared from a child node, the service processor will now direct the relevant child node to perform the processing of 710, followed by 715 (if appropriate), in order to mask out the interrupts. Alternatively, if there are no outstanding interrupts, the service processor identifies and then notifies the relevant parent node where processing is to continue. Thus after each node has completed its processing, control returns to the service processor to direct processing to the next appropriate node (not explicitly shown in FIG. 7). Nevertheless, it may be possible in some embodiments to adopt a more distributed approach, whereby once processing has completed at one node, control passes directly to the next relevant node (down for step 725, up for step 735), without requiring an intervening return to the service processor.

Note that although FIG. 7 illustrates a flowchart corresponding to one particular embodiment, the skilled person will be aware that the processing depicted therein can be modified while still producing substantially similar results. For example, the order of steps 710 and 720 can be interchanged, with appropriate modifications elsewhere (this effectively means that a node will process interrupts from its child nodes before its locally generated interrupts). As another example, the selection of the leftmost child node at step 725 simply ensures that all relevant nodes are processed in a logical and predictable order. However, in another embodiment a different strategy could be used, for example the rightmost child node with an interrupt status could be selected. Indeed it is feasible to select any child node with an interrupt status (for example, the selection could be made purely at random) and the overall processing of the interrupts will still be performed correctly.

It will also be appreciated that the processing of FIG. 7 can be readily extended to two or more interrupt levels (such as for the embodiment shown in FIG. 4). There are a variety of mechanisms for doing this, the two most straightforward being (i) to follow the method of FIG. 7 independently for each interrupt level; and (ii) to process the different interrupt levels altogether, in other words to test to see if any of the interrupt levels is set at steps 710 and 720, and then to set the MPR for all the interrupt levels at step 715 (whether in a single go, or in multiple iterations through step 710).

Similarly the processing of FIG. 7 can also be applied to trees having more than one root (i.e. service processor). Thus if all nodes on the service bus can be reached from a given root, then one possibility is to mask all the interrupts from this one root node. In this case the only modification is to make sure when ascending to a parent node at step 735 that this given root is eventually reached. On the other hand, the method of FIG. 7 is actually robust against the different root nodes being allowed to operate in parallel and independently of one another, since the worst that can happen in this case is that the processing may arrive at a given leaf node only to find that its interrupts have already been masked by processing from another root node. It remains the case nevertheless that all interrupts will be located and masked in due course, despite such multiple roots.

Figure 8A:
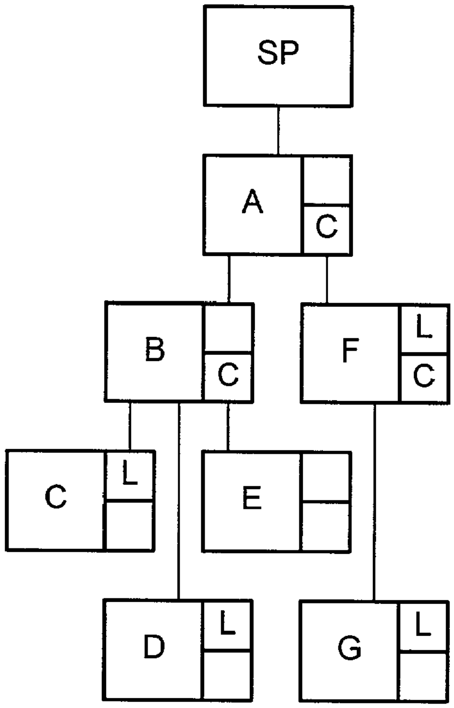
FIGS. 8A, 8B, 8C, 8D, 8E illustrates various stages of masking interrupts from a simplified node structure utilising the method of FIG. 7.
Figure 8B:
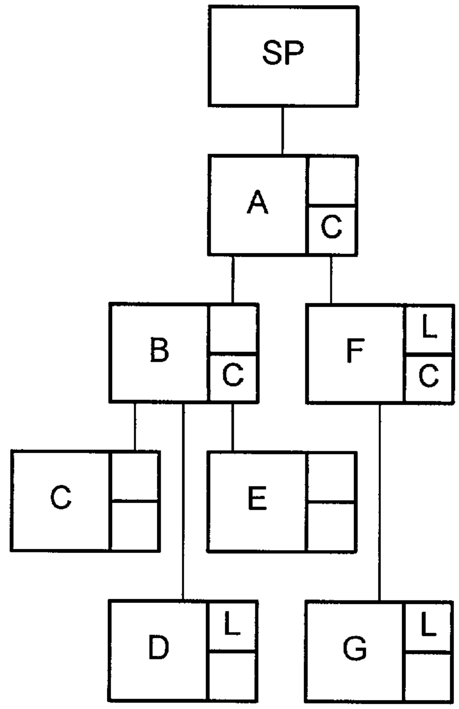
Figure 8C:
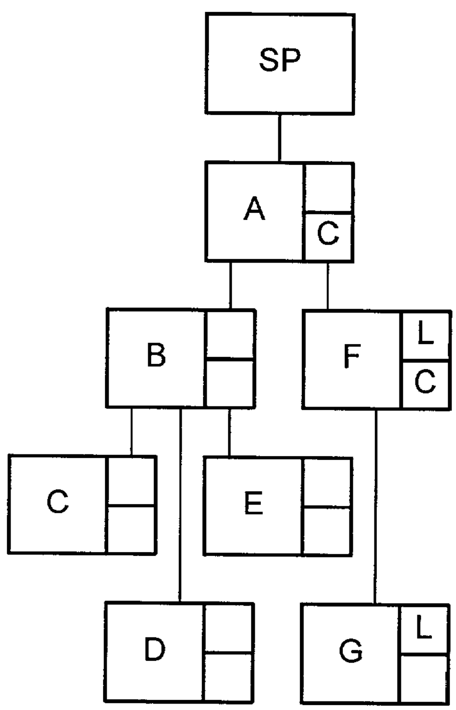

FIGS. 8*a*, 8*b*, 8*c*, 8*d*, and 8*e* illustrate various stages of the application of the method of FIG. 7 to a simplified node architecture. Thus FIG. 8*a* depicts a service processor (SP) at the head of a service bus network comprising seven nodes labelled A through to G. Each node includes two interrupt flags, represented in FIG. 8 by the pair of boxes on the right of the node. The first of these (depicted on top) effectively corresponds to flip-flop 408 in FIG. 4, and contains an L if the node has a locally generated interrupt. On the other hand, if there is no such locally generated interrupt, then this box is empty. The second (lower) box corresponds effectively to flip-flop 445 in FIG. 4, and contains a C if any child nodes of that node have an interrupt status. Note that for leaf nodes C, D, E, and F, this second interrupt status must always be negative, because leaf nodes do not have any child nodes.

Thus looking at FIG. 8*a*, it is assumed in this initial situation that nodes C, D, F and G have a locally generated interrupt, but nodes B, A and E do not have such a locally generated interrupt. Accordingly, nodes C, D, F and G contain an L in the top box. As regards the lower box, all three router or intermediate nodes, namely nodes A, B, and F, do have an interrupt signal from a child node. In particular, node B receives an interrupt status from nodes C and D, node F receives an interrupt status from node G, and node A receives an interrupt status from both node B and node F. Accordingly all three router nodes, namely A, B, and F, have a child interrupt status set as indicated by the presence of the letter C.

If we now apply the processing of FIG. 7 to the node configuration of FIG. 8*a*, we initially arrive at step 710 which produces a negative result because there is no locally generated interrupt at the service processor. There is however an interrupt from a child node, node A, so in accordance with step 725 we descend to node A. We then loop back to step 710 and again this produces a negative outcome since node A does not have a locally generated interrupt, but it is receiving an interrupt from both child nodes, so step 720 is positive.

According to step 725, we then descend the leftmost branch from node A to node B, loop back again to step 710, and follow the processing through once more to descend to node C at step 725. This time when we arrive back at step 710, there is a locally generated interrupt at node C, so we follow the positive branch to update the MPR at step 715. Processing then remains at node C until the MPR is updated sufficiently to remove or mask out all locally generated interrupts. This takes us to the position shown in FIG. 8*b*.

At this point there are no longer any locally generated interrupts at node C, so step 710 produces a negative result, as does step 720, because node C has no child nodes. We therefore go to step 730, which also produces a negative outcome, causing us to ascend the hierarchy to node B at step 735. Returning to step 710, which is again negative because node B has no locally generated interrupts, there is however an interrupt still from a child node, namely node D. Accordingly, step 720 produces a positive result, leading us to step 725, where we descend to node D.

We then loop up again to step 710, and since this node does contain a locally generated interrupt, we go to step 715 where the MPR for node D is updated. These two steps are then repeated if necessary until the locally generated interrupts at node D have been completely masked, taking us to the position illustrated in FIG. 8*c*. Note that in this Figure, the lower box of node B has been cleared because it is no longer receiving an interrupt status from any child node. In other words, once the two L boxes for nodes C and D have been cleared (by masking), node B itself is now clear of interrupts, and so its C box can be cleared. It will be appreciated that using the implementation illustrated in FIG. 4, this clearing of node B as regards its child node interrupt status in effect occurs automatically, since this status is derived directly from the interrupt values maintained at nodes C and D (and E).

After the local interrupts have been masked from node D, the next visit to step 710 results in a negative outcome, as does the test of step 720, since node D is a leaf node with no child nodes. This takes us through to step 730, and from there to step 735, where we ascend up to node B. Since node B now has no interrupts, then steps 710 and 720 will both test negative, as will the test at step 730, leaving us to again ascend the network, this time to node A.

Since node A does not have any locally generated interrupts but only interrupts from child nodes (nodes F), we proceed through steps 710 and 720 to step 725, where we descend to the leftmost child node from which an interrupt signal is being received. This now corresponds to node F, which is the only node currently passing an interrupt signal up to node A.

Figure 8D:
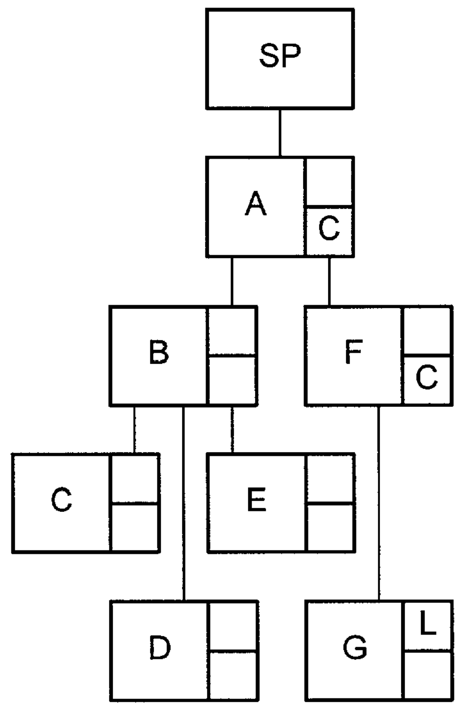

Returning to step 710, this finds that node F is indeed generating its own local interrupt(s), which is (are) masked at step 715, resulting in the situation shown in FIG. 8*d*. There is now only one remaining locally generated interrupt at node G, which is causing a reported interrupt status to be set in its ancestor nodes, namely nodes F and A. Therefore, once the locally generated interrupt in node F has been masked out, the method proceeds to step 720. This has a positive outcome, and so at step 725 we descend to node G.

Figure 8E:
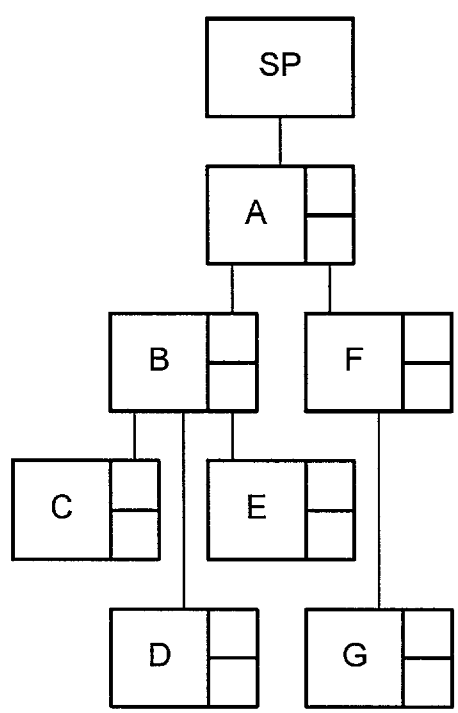

The method now returns back up to step 710, which produces a positive outcome due to the locally generated interrupt at node G. This is then addressed by updating the masking pattern register at step 715 as many times as necessary. Once the locally generated interrupt at node G has been removed, this then clears the child node interrupt status at node F and also at node A (and the service processor). Consequently, the method of FIG. 7 cycles through steps 710, 720, 730 and 735 a couple of times, rising through nodes F and A, before finally returning back up to the service processor. At this point the method exits with all the nodes having a clear interrupt status, as illustrated in FIG. 8*e*.

Note that the above embodiments have been described primarily as a combination of computer hardware and software. For example, certain operations are directly implemented in hardware, such as the determination by comparator 305 at the first node (see FIG. 3) of whether or not the first and second values are the same, and certain operations are implemented by low-level software (firmware or microcode) running on the hardware, such as the packet messaging between nodes. However, it will be appreciated that a wide range of different combinations are possible. These include an all-hardware embodiment, where a suitable device, such as an application specific integrated circuit (ASIC) is used for activities such as message transmission, and an all-software embodiment, which will typically run on general purpose hardware.

Note also that the approach described herein is not necessarily restricted just to computers and computing, but can apply to any situation in which status information needs to be conveyed from one location to another (for example controlling a telecommunications or other form of network, remote security monitoring of various sites, and so on).

In conclusion, a variety of particular embodiments have been described in detail herein, but it will be appreciated that this is by way of exemplification only. The skilled person will be aware of many further potential modifications and adaptations using the teachings set forth herein that fall within the scope of the claimed invention and its equivalents.

The invention claimed is:

1. A method of processing interrupt states in a hierarchical network of nodes having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said method comprising the steps of:

(a) maintaining intrinsic information at each leaf node about one or more interrupt states, and extrinsic information at each intermediate node, wherein said extrinsic information is derived from the interrupt states of those leaf nodes below the intermediate node in the hierarchy;

(b) navigating from said root node to a first leaf node having at least one set interrupt state;

(c) masking out said at least one set interrupt state at said first leaf node, such that it is no longer discernible to those nodes in the hierarchy above said first leaf node;

(d) updating the extrinsic information in any intermediate nodes above said first leaf node in the hierarchy in accordance with the fact that said at least one set interrupt state at the first leaf node is now masked out; and.

(e) repeating steps (b)–(d) with respect to any other leaf nodes in the network having at least one set interrupt state.

2. The method of claim 1, wherein a leaf node maintains a plurality of interrupt states, each of which may be set, and each of which may be individually masked out.

3. The method of claim 2, wherein a leaf node exposes a single output interrupt state to a node immediately above it in the hierarchy, wherein said single output interrupt state is set if at least one of the interrupt states in the leaf node is set without being masked out, and wherein the extrinsic information maintained at those intermediate nodes above the leaf node in the hierarchy is derived from said single output interrupt state.

4. The method of claim 2, wherein each interrupt state comprises a binary variable that indicates whether or not a corresponding interrupt is set.

5. The method of claim 4, further comprising the steps of providing a status register for storing said interrupt states as individual bits, and providing a masking register for storing a plurality of mask bits, each mask bit corresponding to an interrupt state in the status register, wherein an interrupt state is masked out by setting the corresponding mask bit.

6. The method of claim 1, wherein the extrinsic information maintained at an intermediate node represents a consolidated version of the intrinsic information of all leaf nodes and extrinsic information of any intermediate nodes below it in the hierarchy, and wherein said consolidated version is regarded as representing the single output interrupt state of the intermediate node.

7. The method of claim 6, wherein a change in the single output interrupt state of a first node in the network is automatically propagated to those nodes above it in the hierarchy, thereby allowing those nodes to update their extrinsic information in accordance with the changed single output interrupt state of the first node.

8. The method of claim 1, wherein at least one intermediate node in the network maintains intrinsic information about one or more interrupt states, each of which may be individually masked out, and said method further comprises repeating steps (b)–(d) with respect to those intermediate nodes in the network having at least one set interrupt state.

9. The method of claim 8, wherein an intermediate node exposes a single output interrupt state to a node immediately above it in the hierarchy, and wherein said single output interrupt state is set if said intermediate node has at least one set interrupt state not masked out, or if any leaf node or intermediate node below it in the hierarchy has at least one set interrupt state not masked out.

10. The method of claim 1, wherein information about a change in the interrupt states of a leaf node is automatically propagated up the hierarchy towards the root node.

11. The method of claim 1, wherein said step of navigating comprises selecting the leaf nodes for each branch of the tree in turn.

12. The method of claim 1, further comprising the subsequent steps, for each leaf node having at least one set interrupt state, of resetting said at least one set interrupt state for the node, and then unmasking said at least one set interrupt state.

13. A method of processing state information in a leaf node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said method comprising the steps of:

(a) maintaining one or more information items at the leaf node, each of which is set according to whether or not a corresponding interrupt is present, and each of which may be individually masked out, wherein the leaf node is regarded as having a particular output state if at least one of said information items is set without being masked out, and wherein the leaf node does not initially have said particular output state;

(b) setting at least one information item to indicate that a corresponding interrupt is present;

(c) propagating a first change in said particular output state of the leaf node to the intermediate node above it in the hierarchy;

(d) responsive to a command received over said network, masking out said at least one information item that has been set to indicate that a corresponding interrupt is present; and (e) propagating a second change in said particular output state of the leaf node to the intermediate node above it in the hierarchy.

14. The method of claim 13, wherein said step of masking out comprises masking out each information item at the leaf node that has been set to indicate that a corresponding interrupt is present.

15. The method of claim 13, wherein each information item comprises a binary variable representing the presence or absence of the corresponding interrupt.

16. The method of claim 15, further comprising the steps of providing a status register for storing said information items as individual bits, and providing a masking register for storing a plurality of mask bits, each mask bit corresponding to an information item in the status register, wherein an information item is masked out by setting the corresponding mask bit.

17. The method of claim 13, further comprising the subsequent steps of resetting said at least one information item that has been set to indicate that a corresponding interrupt is present, and unmasking said at least one set information item.

18. A method of processing state information in an intermediate node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said method comprising the steps of:

(a) maintaining an extrinsic information item at the intermediate node representing a consolidated version of whether an interrupt state is present in any leaf node or intermediate node below it in the hierarchy;

(b) maintaining one or more intrinsic information items, each of which may be set to indicate the presence of a corresponding interrupt state, and each of which may be individually masked out;

(c) setting the intermediate node to have an overall interrupt state if at least one of said intrinsic or extrinsic information items indicates the presence of an interrupt state without being masked out;

(d) responsive to a command from higher in the network, masking out any intrinsic information item that is set to indicate the presence of an interrupt state; and (e) propagating any change in the overall interrupt state of the intermediate node up the network hierarchy.

19. Apparatus forming a hierarchical network of nodes having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, wherein:

each leaf node includes memory for maintaining intrinsic information about one or more interrupt states, a mask corresponding to each interrupt state, causing it to be disregarded if the mask is set, and a communications link to an intermediate node, wherein said leaf node is responsive to a change in said one or more interrupt states to notify the intermediate node accordingly over the communications link;

each intermediate node includes memory for maintaining extrinsic information about the interrupt state of leaf nodes below it in the hierarchy; and said apparatus further includes logic for processing in turn each leaf node having at least one set interrupt state to mask out said at least one set interrupt state.

20. The apparatus of claim 19, wherein a leaf node maintains a plurality of information items, each which indicates whether or not a corresponding interrupt state is set, and each of which may be individually masked out.

21. The apparatus of claim 20, wherein a leaf node exposes a single output interrupt state to a node immediately above it in the hierarchy, and wherein said single output interrupt state is set if at least one of the interrupt states in the leaf node is set without being masked out.

22. The apparatus of claim 20, wherein each information item comprises a binary variable that represents the presence or absence of an interrupt.

23. The apparatus of claim 22, wherein each leaf node includes a status register for storing said information items as individual bits, and a masking register for storing a plurality of mask bits, each mask bit corresponding to an information item in the status register, wherein an information item is masked out by setting the corresponding mask bit.

24. The apparatus of claim 19, wherein at least one intermediate node in the network includes memory for maintaining intrinsic information comprising one or more information items, each of which may be set to indicate the presence of an interrupt, and each of which may be individually masked out.

25. The apparatus of claim 24, wherein an intermediate node exposes a single output interrupt state if any information item therein is set to indicate the presence of an interrupt without being masked out, or if any leaf node or intermediate node below it in the hierarchy includes an information item that is set to indicate the presence of an interrupt without being masked out.

26. The apparatus of claim 19, wherein a mask is reset in response to resetting the corresponding interrupt state.

27. Apparatus for use as a leaf node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said apparatus comprising:

memory for maintaining one or more information items at the leaf node, each of which is set according to whether or not a corresponding interrupt is present, and each of which may be individually masked out responsive to a command received over the network, wherein the leaf node is regarded as having a particular output state if at least one of said information items is set without being masked out, and wherein the leaf node does not initially have said particular output state;

logic for setting at least one information item to indicate that a corresponding interrupt is present; and a communications link for connection to the intermediate node immediately above it in the hierarchy, wherein a change in the particular output state of the leaf node is propagated over said link.

28. The apparatus of claim 27, wherein each information item comprises a binary variable representing the presence or absence of an interrupt.

29. The apparatus of claim 28, wherein said memory comprises a status register for storing said information items as individual bits, and wherein said apparatus further comprises a masking register for storing a plurality of mask bits; each mask bit corresponding to an information item in the status register, wherein an information item is masked out by setting the corresponding mask bit.

30. The apparatus of claim 27, wherein said leaf node is responsive to a command received from the network to reset said at least one information item that has been set to indicate that a corresponding interrupt is present, and to unmask said at least one information item.

31. Apparatus for use as an intermediate node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said apparatus comprising:

a memory for storing an extrinsic information item representing a consolidated version of whether an interrupt state is present in any leaf node or intermediate node in the hierarchy below the intermediate node, and for storing one or more intrinsic information items, each of which may be set to indicate the presence of a corresponding interrupt state, and each of which may be individually masked out;

logic for setting the intermediate node to have an overall interrupt state if any of said intrinsic or extrinsic information items indicates the presence of an interrupt without having been masked out, and, in response to a predetermined command from higher in the network, for masking out any intrinsic information items that indicate file presence of an interrupt; and a communications link for propagating any change in the overall interrupt state of the intermediate node up the network hierarchy.

32. Apparatus for processing state information in a hierarchical network of nodes having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said apparatus comprising:

means for maintaining intrinsic information at each leaf node about one or more interrupt states, and extrinsic information at each intermediate node, wherein said extrinsic information is derived from the interrupt states of those leaf nodes below the intermediate node in the hierarchy;

means for navigating from said root node to a first leaf node having at least one set interrupt state;

means for masking out said at least one set interrupt state at said first leaf node, such that it is no longer discernible to those nodes in the hierarchy above said first leaf node; and means for updating the extrinsic information in any intermediate nodes above said first leaf node in the hierarchy in accordance with the fact that said at least one set interrupt state at the first leaf node is now masked out.

33. Apparatus for processing state information in a leaf node in a hierarchical network of nodes, said network having a tree configuration comprising a root node at the top of the hierarchy, one or more intermediate nodes; and a plurality of leaf nodes at the bottom of the hierarchy, wherein each leaf node is linked to the root node by zero, one or more intermediate nodes, said apparatus comprising:

means for maintaining one or more information items at the leaf node, each of which is set according to whether or not a corresponding interrupt is present, and each of which may be individually masked out, wherein the leaf node is regarded as having a particular output state if at least one of said information items is set without being masked out, and wherein the leaf node does not initially have said particular output state;

means for setting at least one information item to indicate that a corresponding interrupt is present;.

means for propagating a first change in said particular output state of the leaf node to the intermediate node above it in the hierarchy;

means, responsive to a command received over said network, for masking out said at least one information item that has been set to indicate that a corresponding interrupt is present; and means for propagating a second change in said particular output state of the leaf node to the intermediate node above it in the hierarchy.

34. Apparatus for processing state information in an intermediate node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, said apparatus comprising:

means for maintaining an extrinsic information item at the intermediate node representing a consolidated version of whether an interrupt state is present in any leaf node or intermediate node below it in the hierarchy;

means for maintaining one or more intrinsic information items, each of which may be set to indicate the presence of an interrupt state, and each of which may be individually masked out;

means for setting the intermediate node to have an overall interrupt state if at least one of said intrinsic or extrinsic information items indicates the presence of an interrupt state without being masked out;

means, responsive to a command from higher in the network, for masking out any intrinsic information item that is set to indicate the presence of an interrupt state; and.

means for propagating any change in the overall interrupt state of the intermediate node up the network hierarchy.

35. A computer program product comprising program instructions in machine readable form in a physical medium which, when loaded into one or more machines in a hierarchical network of nodes having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, cause said one or more machines to perform the steps of:

(a) maintaining intrinsic information at each leaf node about one or more interrupt states, and extrinsic information at each intermediate node, wherein said extrinsic information is derived from the interrupt states of those leaf nodes below the intermediate node in the hierarchy;

(b) navigating from said root node to a first leaf node having at least one set interrupt state;

(c) masking out said at least one set interrupt state at said first leaf node, such that it is no longer discernible to those nodes in the hierarchy above said first leaf node;

(d) updating the extrinsic information in any intermediate nodes above said first leaf node in the hierarchy in accordance with the fact that said at least one set interrupt state at the first leaf node is now masked out; and (e) repeating steps (b)–(d) with respect to any other leaf nodes in the network having at least one set interrupt state.

36. The computer program product of claim 35, wherein a leaf node maintains a plurality of information items, each of which indicates whether or not a corresponding interrupt is set, and each of which may be individually masked out.

37. The computer program product of claim 36, wherein a leaf node exposes a single output interrupt state to a node immediately above it in the hierarchy, and wherein said single output interrupt state is set if at least one of the interrupt states in the leaf node is set without being masked out.

38. The computer program product of claim 36, wherein each information item comprises a binary variable that represents the presence or absence of an interrupt.

39. The computer program product of claim 38, wherein said program instructions interact with a status register for storing said information items as individual bits, and a masking register for storing a plurality of mask bits, each mask bit corresponding to an information item in the status register, wherein an information item is masked out by setting the corresponding mask bit.

40. The computer program product of claim 35, wherein the extrinsic information maintained at an intermediate node represents a consolidated version of the interrupt states of all leaf nodes below it in the hierarchy, and wherein said consolidated version is regarded as representing the single output interrupt state of the intermediate node.

41. The computer program of claim 40, wherein a change in the single output interrupt state of a first node in the network is automatically propagated to those nodes above it in the hierarchy, thereby allowing those nodes to update their extrinsic information in accordance with the changed single output interrupt state of the first node.

42. The computer program of claim 35, wherein at least one intermediate node in the network maintains intrinsic information about one or more interrupt states, each of which may be individually masked out, and said program instructions cause said one or more machines to repeat steps (b)–(d) with respect to those intermediate nodes in the network having at least one set interrupt state.

43. The computer program product of claim 42, wherein an intermediate node exposes a single output interrupt state to a node immediately above it in the hierarchy, and wherein said single output interrupt state is set if said intermediate node has at least one set interrupt state not masked out, or if any leaf node or intermediate node below it in the hierarchy has at least one set interrupt state not masked out.

44. The computer program product of claim 35, wherein said step of navigating comprises selecting the leaf nodes for each branch of the tree in turn.

45. The computer program product of claim 35, wherein information about a change in the interrupt state of a leaf node is automatically propagated up the hierarchy towards the root node.

46. The computer program product of claim 35, wherein said program instructions further cause said one or more machines to perform the subsequent steps, for each leaf node having at least one set interrupt state, of resetting said at least one set interrupt state for the node, and then unmasking said at least one set interrupt state.

47. A computer program product comprising program instructions in machine readable form in a physical medium which, when loaded into apparatus forming a leaf node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, cause said apparatus to perform the steps of:

(a) maintaining one or more information items at the leaf node, each of which is set according to whether or not a corresponding interrupt is present, and each of which may be individually masked out, wherein the leaf node is regarded as having a particular output state if at least one of said information items is set without being masked out, and wherein the leaf node does not initially have said particular output state;

(b) setting at least one information item to indicate that a corresponding interrupt is present;

(c) propagating a first change in said particular output state of the leaf node to the intermediate node above it in the hierarchy;

(d) responsive to a command received over said network, masking out said at least one information item that has been set to indicate that a corresponding interrupt is present; and (e) propagating a second change in said particular output state of the leaf node to the intermediate node above it in the hierarchy.

48. The computer program product of claim 47, wherein said step of masking out comprises masking out each information item at the leaf node that has been set to indicate that a corresponding interrupt is present.

49. The computer program product of claim 47, wherein each information item comprises a binary variable representing the presence or absence of the corresponding interrupt.

50. The computer program product of claim 49, wherein said program instructions interact with a status register for storing said information items as individual bits, and a masking register for storing a plurality of mask bits, each mask bit corresponding to an information item in the status register, wherein an information item is masked out by setting the corresponding mask bit.

51. The computer program product of claim 47, wherein said program instructions cause said apparatus to further perform the steps of resetting said at least one information item that has been set to indicate that a corresponding interrupt is present, and unmasking said at least one set information item.

52. A computer program product comprising program instructions in machine readable form in a physical medium which, when loaded into apparatus representing an intermediate node in a hierarchical network of nodes, said network having a tree configuration comprising a root node at the top of the hierarchy, one or more intermediate nodes, and a plurality of leaf nodes at the bottom of the hierarchy, wherein each leaf node is linked to the root node by zero, one or more intermediate nodes, cause said apparatus to perform the steps of:

(a) maintaining an extrinsic information item at the intermediate node representing a consolidated version of whether an interrupt state is present in any leaf node or intermediate node below it in the hierarchy;

(b) maintaining one or more intrinsic information items, each of which may be set to indicate the presence of an interrupt state, and each of which may be individually masked out;

(c) setting the intermediate node to have an overall interrupt state if at least one of said intrinsic or extrinsic information items indicates the presence of an interrupt state without being masked out;

(d) responsive to a command from higher in the network, masking out any intrinsic information item that is set to indicate the presence of an interrupt state; and (e) propagating any change in the overall interrupt state of the intermediate node up the network hierarchy.

* * * * *